United States Patent
Krishnamurthy et al.

(10) Patent No.: US 12,126,440 B2
(45) Date of Patent: Oct. 22, 2024

(54) COMMUNICATION DEVICES AND METHODS BASED ON MARKOV-CHAIN MONTE-CARLO (MCMC) SAMPLING

(71) Applicant: Intel Corporation, Santa Clara, CA (US)

(72) Inventors: Sundar Krishnamurthy, Sunnyvale, CA (US); Lu Lu, Hillsboro, OR (US); Niranjan Mylarappa Gowda, Hillsboro, OR (US); Le Liang, Hillsboro, OR (US); Richard Dorrance, Hillsboro, OR (US); Deepak Dasalukunte, Beaverton, OR (US); Arvind Merwaday, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 17/134,255

(22) Filed: Dec. 25, 2020

(65) Prior Publication Data
US 2022/0209891 A1 Jun. 30, 2022

(51) Int. Cl.
*H04L 27/06* (2006.01)
*H04L 1/00* (2006.01)
(Continued)

(52) U.S. Cl.
CPC .......... *H04L 1/0053* (2013.01); *H04L 1/0054* (2013.01); *H04L 25/0256* (2013.01); *H04L 27/38* (2013.01)

(58) Field of Classification Search
CPC ................ H04B 1/7103; H04B 1/7105; H04B 2001/71077; H04B 7/0413; H04L 1/005;
(Continued)

(56) References Cited

U.S. PATENT DOCUMENTS 7,813,438 B2  10/2010  Farhang-Boroujeny et al.
8,675,780 B2   3/2014  Chockalingam et al.
(Continued)

OTHER PUBLICATIONS

Architecture and Algorithm for a Stochastic Soft-output MIMO Detector, Kiarash Amiri, Predrag Radosavljevic, Joseph R. Cavallaro, Asilomar Conference on Signals, Systems and Computers, Nov. 2007.
(Continued)

*Primary Examiner* — Khai Tran
(74) *Attorney, Agent, or Firm* — Banner & Witcoff Ltd.

(57) ABSTRACT

Bayesian Inference based communication receiver employs Markov-Chain Monte-Carlo (MCMC) sampling for performing several of the main receiver functionalities. The channel estimator estimates the multipath channel coefficients corresponding to a signal received with fading. The symbol demodulator demodulates the received signal according to a QAM constellation, so as to generate a demodulated signal, and estimate the transmitted symbols. The decoder reliably decodes the demodulated signals to generate an output bit sequence, factoring in redundancy induced at a certain code rate. A universal sampler may be configured to use MCMC sampling for generating estimates of channel coefficients, transmitted symbols or decoder bits, for aforementioned functionalities, respectively. The samples may then be used in one or more of the receiver tasks: channel estimation, signal demodulation, and decoding, which leads to a more scalable, reusable, power/area efficient receiver.

26 Claims, 7 Drawing Sheets

(51) Int. Cl.
  *H04L 25/02* (2006.01)
  *H04L 27/38* (2006.01)
(58) Field of Classification Search
  CPC ........... H04L 1/0054; H04L 2025/0342; H04L 25/067
  USPC .................................................. 375/341, 342
  See application file for complete search history.

(56) References Cited

U.S. PATENT DOCUMENTS

| | | | |
|---|---|---|---|
| 2009/0220016 A1* | 9/2009 | Dangl | H04L 25/03171 375/316 |
| 2013/0246056 A1* | 9/2013 | Sugiyama | G10L 21/003 704/205 |
| 2017/0365275 A1* | 12/2017 | Lee | G10L 15/063 |
| 2018/0306837 A1* | 10/2018 | Sadeghian Marnani | G01Q 60/32 |
| 2019/0026642 A1 | 1/2019 | Hedstrom et al. | |

OTHER PUBLICATIONS

Stochastic Iterative MIMO Detection System: Algorithm and Hardware Design, Jienan Chen, Jianhao Hu, and Gerald E. Sobelman, IEEE Transaction on Cicruits and Systems—I: Regular Papers, vol. 62, No. 4, Apr. 2015.

Stochastic MIMO Detector Based on the Markov Chain Monte Carlo Algorithm, Jienan Chen, Jianhao Hu, and Gerald E. Sobelman, IEEE Transactions on Signal Processing, vol. 62, No. 6, Mar. 2014.

Optimized Markov Chain Monte Carlo for Signal Detection in MIMO Systems: An Analysis of the Stationary Distribution and Mixing Time, Babak Hassibi, Morten Hansen, Alexandros G. Dimakis, Haider Ali Jasim Alshamary, and Weiyu Xu, IEEE Transactions on Signal Processing, vol. 62, No. 17, Sep. 2014.

Implementation of a Markov Chain Monte Carlo Based Multiuser/MIMO Detector, Stephen Andrew Laraway, Behrouz Farhang-Boroujeny, ICC 2006.

Achieving Near MAP Performance with an Excited Markov Chain Monte Carlo MIMO Detector, Jonathan Hedstrom, Chung Him Yuen, Rong-Rong Chen, Behrouz Farhang-Boroujeny, IEEE Transactions on Wireless Communications, vol. 16 Issue 12 Dec. 2017.

Markov Chain Monte Carlo Algorithms for CDMA and MIMO Communication Systems, B. Farhang-Boroujeny, H. Zhu, and Z. Shi, IEEE Transaction on Signal Processing, vol. 54, No. 5, May 2006, pp. 1896-1909.

On performance of sphere decoding and Markov chain Monte Carlo detection methods, H. Zhu, B. Farhang-Boroujeny and R.R. Chen, IEEE Signal Processing Letters, vol. 12, pp. 669-672, 2005.

Near-Optimal Large-MIMO Detection Using Randomized MCMC and Randomized Search Algorithms, Kumar, S. Chandrasekaran, A. Chockalingam, and B. S. Rajan, IEEE ICC'2011, Kyoto, Jun. 2011, pp. 1-5.

MCMC-Based Channel Estimation for OFDM systems in Dispersive Time-varying Channels, Ge Yao, Jiang Zhe, Zhao Yi-xuan, Shen Xiao-hong, IEEE International Conference on Signal Processing, Communications and Computing (ICSPCC) 2015.

On the sphere-decoding algorithm I. Expected complexity, B. Hassibi, H. Vikalo, IEEE Transactions on Signal Processing, vol. 53, Iss. 8, Aug. 2005.

On the sphere-decoding algorithm II. Generalizations, second-order statistics, and applications to communications, H. Vikalo, B. Hassibi, IEEE Transactions on Signal Processing, vol. 53, Iss. 8, Aug. 2005.

Gradient based adaptive Markov Chain Monte Carlo, Michalis Titsias, Petros Dellaportas, NIPS 2019.

Achieving near-capacity on a multiple-antenna channel, Hochwald, B. M., & Ten Brink, S., IEEE Transactions on Communications, vol. 51(3), pp. 389-399. 2003.

Joint twofold-iterative channel estimation and multiuser detection for MIMO-OFDM systems, S. P. Rossi and R. R. Muller, IEEE Transactions on Wireless Communications, vol. 7, No. 11, pp. 4919-4727, 2008.

B. M. Hochwald and S. ten Brink, "Achieving near-capacity on a multiple-antenna channel", IEEE Trans. Commun., vol. 51, No. 3, pp. 389-399, Mar. 2003. <https://ieeexplore.IEEE.org/document/1194444>.

Z. Guo and P. Nilsson, "Algorithm and implementation of the K-Best sphere decoding for MIMO detection", IEEE J. Sel. Areas Commun., vol. 24, No. 3, pp. 491-503, Mar. 2006. https://ieeexplore.IEEE.org/document/1603705.

J. Hedstrom, et al., Achieving Near MAP Performance With an Excited Markov Chain Monte Carlo MIMO Detector <https://ieeexplore.IEEE.org/document/8046155>; 2017.

X. Mao, p. Amini and B. Farhang-Boroujeny, "Markov chain Monte Carlo MIMO detection methods for high signal-to-noise ratio regimes", Proc. IEEE Global Telecommun. Conf. (GLOBECOM), pp. 3979-3983, Nov. 2007. <https://ieeexplore.IEEE.org/document/4411666>.

D. Halperin, W. Hu, A. Sheth and D. Wetherall, "802.11 with multiple antennas for dummies", ACM SIGCOMM Comput. Commun. Rev., vol. 40, No. 1, pp. 19-25, Jan. 2010. <https://dl.acm.org/doi/10.1145/1672308. 1672313>.

F. Boccardi et al., "Multiple-antenna techniques in LTE-advanced", IEEE Commun. Mag., vol. 50, No. 3, pp. 114-121, Mar. 2012. <https://ieeexplore.IEEE.org/document/6163590>.

B. Farhang-Boroujeny, H. Zhu and Z. Shi, "Markov chain Monte Carlo algorithms for CDMA and MIMO communication systems", IEEE Trans. Signal Process., vol. 54, No. 5, pp. 1896-1909, May 2006. <https://ieeexplore.IEEE.org/document/1621417>.

S. A. Laraway and B. Farhang-Boroujeny, "Implementation of a Markov chain Monte Carlo based multiuser/MIMO detector", IEEE Trans. Circuits Syst. I Reg. Papers, vol. 56, No. 1, pp. 246-255, Jan. 2009. <https://ieeexplore.IEEE.org/document/4530857>.

R. Peng, K. H. Teo, J. Zhang and R.-R. Chen, "Low-complexity hybrid Qrd-Mcmc Mimo detection", Proc. IEEE Global Telecommun. Conf. (GLOBECOM), pp. 1-5, Nov. 2008. <https://ieeexplore.IEEE.org/document/4698582>.

F.L. Yuan, C.-H. Yang and D. Markovic, "A hardware-efficient VLSI architecture for hybrid sphere-MCMC detection", Proc. IEEE Global Telecommun. Conf. (GLOBECOM), pp. 1-6, Dec. 2011. <https://ieeexplore.IEEE.org/ document/6134312>.

M. Hansen, B. Hassibi, A. G. Dimakis and W. Xu, "Near-optimal detection in MIMO systems using gibbs sampling", Proc. IEEE Global Telecommun. Conf. (GLOBECOM), pp. 1-6, Nov. 2009. <https://ieeexplore.IEEE.org/document/5425927>.

M. Senst and G. Ascheid, "A Rao-Blackwellized Markov chain Monte Carlo algorithm for efficient MIMO detection", Proc. IEEE Int. Conf. Commun. (ICC), pp. 1-6, Jun. 2011. <https://ieeexplore.IEEE.org/document/5962492>.

D. Auras, U. Deidersen, R. Leupers and G. Ascheid, "VLSI design of a parallel MCMC-based MIMO detector with multiplier-free gibbs samplers", Proc. IEEE Int. Conf. Very Large Scale Integr. (VLSI-SoC), pp. 1-6, Oct. 2014. <https://ieeexplore.IEEE.org/document/7004160>.

J. S. Yedidia, "Representing codes for belief propagation decoding," IEEE International Symposium on Information Theory, 2003. Proceedings., Yokohama, Japan, 2003, p. 176. <https://ieeexplore.IEEE.org/document/1228190>.

J. Jin, X. Liang, Y. Xu, Z. Zhang, X. You and C. Zhang, "LDPC Decoder Based on Markov Chain Monte Carlo Method," 2018 IEEE Asia Pacific Conference on Circuits and Systems (APCCAS), Chengdu, 2018, pp. 219-222. <https://ieeexplore.IEEE.org/document/8605692>.

Curse of dimensionality: <https://en.wikipedia.org/wiki/Curse_of_dimensionality>, Nov. 2008.

T. Wadayama, et al., Gradient descent bit flipping algorithms for decoding LDPC codes <https://ieeexplore.IEEE.org/ document/5474623>, 2019.

3GPP TSG-RAN, "Study on physical layer enhancements for NR ultra-reliable and low latency case (URLLC)," 3GPP TR 38.824, v1.0.0, Mar. 2020.

(56) References Cited

OTHER PUBLICATIONS

ETSI, "Intelligent Transport System (ITS); Local Dynamic Map (LDM), rationale for and guidance on standardization," Technical Report, ETSI TR 102 863, V1.1.1, Jun. 2011.

K. Wariishi and H. Kinjo, "Development of dynamic map for automated driving and its potential to be next-gen industrial infrastructure," Technical Report, Mitsui & Co. Global Strategic Studies Institute, Jul. 2018.

ETSI, "Intelligent Transport System (ITS); Specification of cooperative awareness basic service", Technical Specification, ETSI EN 302 637-2 V1.3.2, Nov. 2014.

ETSI, "Intelligent Transport System (ITS); Specification of the Collective Perception Service", Technical Specification Draft, ETSI TS 103 324 V0.0.15, Feb. 2020.

IEEE, "IEC/IEEE 60802 TSN Profile for Industrial Automation", Technical Standard, Jan. 2019.

FlexRAN: <https://mosaic5g.io/apidocs/flexran/flexran_spec_v2.2.3.html>, Oct. 2020.

\* cited by examiner

COMMUNICATION DEVICES AND METHODS BASED ON MARKOV-CHAIN MONTE-CARLO (MCMC) SAMPLING

TECHNICAL FIELD

Various aspects of this disclosure generally relate to wireless communication systems and methods.

BACKGROUND

Data transmission in a communication system involves efficient handling of the detrimental effects of multipath interference and Additive white Gaussian noise (AWGN). This poses unique challenges in systems where the problem evolves into a high-dimensional search in a large search space, such as in MIMO (multiple-input and multiple-output) OFDM (Orthogonal frequency-division multiplexing) systems. To this end, receivers typically perform multiple tasks in series to decode the signal. Custom Hardware (HW) blocks may be designed to perform these tasks with individual optimization metrics that allow a reasonable performance-complexity tradeoff. Typically, channel estimation is based on minimizing mean-squared error (MSE) criterion leading to an MMSE channel estimator, while symbol demodulation is based on a Sphere Decoder that achieves near Maximum Likelihood (ML) performance. Often, HW complexity limits the design choices of these algorithms, especially since each module is optimized in isolation, and implementing near-ML solutions HW for even moderately sized antenna configurations still remains a challenge.

An ever-growing demand for high data rates and service capabilities provides a need for highly efficient system design. Multimedia capabilities with different quality-of-service (QoS), latency and performance requirements must be supported for a wide range of devices and networks. Multiple Input Multiple Output (MIMO) and Orthogonal Frequency Division Multiplexing (OFDM) are example communication technologies that enable bandwidth efficient communication. While MIMO and OFDM are stable technologies to use bandwidth efficiently, there is a desire for optimizing system architecture to reduce the area, power consumption and other system resources.

Aspects of the disclosure leverage Markov-Chain Monte-Carlo (MCMC) algorithms to provide systems (e.g. receiver) and methods that advantageously reduce or eliminate implementation of dedicated signal processing blocks in the physical layer, which becomes even more advantageous with advances in fifth generation (5G) wireless communications. Aspects further incorporating probabilistic methods to process a received signal, which allows for machine learning algorithms to be leveraged in both data and control planes of the wireless receiver when compared to the traditional implementations of the baseband.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
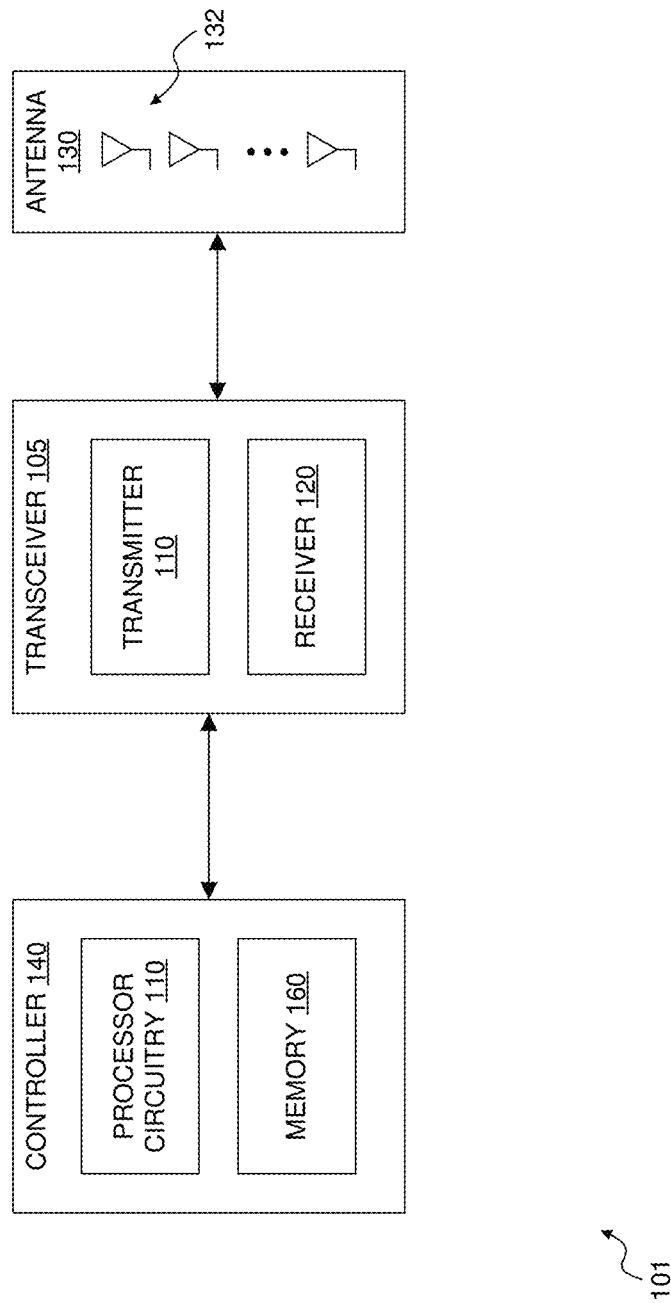
FIG. 1 illustrates a communication device according to exemplary aspects of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Receivers in wireless communication devices may perform multiple tasks in series to decode the received signal, including channel estimation, symbol demodulation and channel decoding. Receiver performance may be increased when aforementioned receiver tasks are optimized jointly with Maximum a posteriori Probability (MAP) criterion, since they maximize both likelihood and prior information of all the parameters being estimated (output as well as latent). Although aspects are described with reference to wireless communications, the present disclosure is not limited to wireless communication technologies and the aspects can advantageously be implemented in any signal processing and signal estimation technologies, such as image, video, audio, or other data processing operations Aspects of the present disclosure include Probabilistic Computing and use Bayesian Inference to get optimal Maximum a posteriori Probability (MAP) estimates. One or more aspects use Markov-Chain Monte-Carlo (MCMC) sampling (e.g. Gibbs and Metropolis Hastings sampling). In exemplary aspects, the systems and methods include performing both channel estimation and symbol demodulation, which may be optimize individually or jointly.

Aspects of the disclosure employ MCMC using improved Gibbs sampling and Metropolis Hastings sampling techniques to achieve MAP performance while enabling reusable, scalable, area efficient HW designs as well as provide improved trade-off of performance and complexity. In one or more exemplary aspects, channel estimation and symbol demodulation may use the same hardware logic that performs MCMC sampling to obtain optimal MAP estimates of the channel or symbol, respectively. Supporting these two broad categories of MCMC sampling techniques also enable aspects of the present disclosure to be applied to other signal estimation operations, such as image, video, audio processing operations.

Aspects of the present disclosure advantageously provide: reduced system resources (e.g. low area and power consumption for handling multiple functionalities) while providing optimal MAP performance, improved performance-complexity-latency trade-off (e.g. a configurable number of samples drawn and number of parallel samplers for the MCMC probabilistic sampler can provide better trade-off opportunities and design choices), scalable configurations supporting large number of antennas and modulation orders, especially Massive and Multi-user MIMO scenarios, and joint processing configurations for communication and computing (e.g. using a same hardware module).

FIG. 1 illustrates a wireless communication device according to an exemplary aspect of the present disclosure.

The communication device 101 is configured to transmit and/or receive wireless communications via one or more wireless technologies. The communication device 101 can be configured for wireless communications to fifth generation (5G) wireless technologies and related spectrums, or other wireless technologies and spectrums as would be understood by one of ordinary skill in the relevant arts. The other wireless communication technologies may include, but are not limited to Institute of Electrical and Electronics Engineers (IEEE) 802.11 standards, Long Term Evolution (LTE), and/or one or more other communication protocols as would be understood by one of ordinary skill in the relevant arts, such as Radio Frequency (RF), Infra-Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth, ZigBee, or the like.

The communication device 101 can be configured to communicate with one or more other communication devices, including, for example, one or more base stations, one or more access points, one or more other communication devices, one or more network components, and/or one or more other devices as would be understood by one of ordinary skill in the relevant arts.

In an exemplary aspect, the communication device 101 includes a controller 140 communicatively coupled to one or more transceivers 105. In an exemplary aspect, the controller 140 includes processor circuitry 150 that is configured to control the overall operation of the communication device 101, such as the operation of the transceiver(s) 105. The processor circuitry 150 may be configured to control the transmitting and/or receiving of wireless communications via the transceiver(s) 105.

In an exemplary aspect, the processor circuitry 150 is configured to perform one or more baseband processing functions (e.g., media access control (MAC), encoding/decoding, modulation/demodulation, data symbol mapping; error correction, etc.) in cooperation with the transceiver 105 or instead of such operations/functions being performed by the transceiver 105. The processor circuitry 150 is configured to run one or more applications and/or operating systems; power management (e.g., battery control and monitoring); display settings; volume control; and/or user interactions via one or more user interfaces (e.g., keyboard, touchscreen display, microphone, speaker, etc.) in one or more aspects.

In an exemplary aspect, the controller 140 further includes a memory 160 that stores data and/or instructions, where when the instructions are executed by the processor circuitry 150, controls the processor circuitry 150 to perform the functions described herein.

The memory 160 may be any well-known volatile and/or non-volatile memory.

Examples of the communication device 101 include (but are not limited to) Access Points (APs), base stations, eNodeBs (E-UTRAN Node B), New Radio (NR) or next generation Node Bs (gNodeB or gNB—note that this term is typically used in the context of 3GPP fifth generation (5G) communication systems). In other aspects, some or all features defined for network equipment may be implemented by a User Equipment (UE), and the communication device 101 may include a mobile computing device (mobile device)—such as a laptop computer, a tablet computer, a mobile telephone or smartphone, a "phablet," a personal digital assistant (PDA), and mobile media player; a wearable computing device—such as a computerized wrist watch or "smart" watch, and computerized eyeglasses; and/or internet-of-things (IoT) device. In some aspects of the present disclosure, the communication device 101 may be a stationary communication device, including, for example, a stationary computing device—such as a personal computer (PC), a desktop computer, television, smart-home device, security device (e.g., electronic/smart lock), automated teller machine, a computerized kiosk, and/or an automotive/aeronautical/maritime in-dash computer terminal. The communication device 101 may also be remotely controllable device, such as a drone or other controllable device.

In one or more aspects, the communication device 101 or one or more components of the communication device 101 is additionally or alternatively configured to perform digital signal processing (e.g., using a digital signal processor (DSP)), modulation and/or demodulation (using a modulator/demodulator), a digital-to-analog conversion (DAC) and/or an analog-to-digital conversion (ADC) (using a respective DA and AD converter), an encoding/decoding (e.g., using encoders/decoders having convolution, tail-biting convolution, turbo, Viterbi, and/or Low Density Parity Check (LDPC) encoder/decoder functionality), frequency conversion (using, for example, mixers, local oscillators, and filters), Fast-Fourier Transform (FFT), preceding, and/or constellation mapping/de-mapping to transmit and/or receive wireless communications conforming to one or more wireless protocols and/or facilitate the beamforming scanning operations and/or beamforming communication operations.

The transceiver(s) 105 is configured to transmit and/or receive wireless communications via one or more wireless technologies. In an exemplary aspect, the transceiver 105 includes processor circuitry that is configured for transmitting and/or receiving wireless communications conforming to one or more wireless protocols.

In an exemplary aspect, the transceiver 105 includes a transmitter 110 and a receiver 120 configured for transmitting and receiving wireless communications, respectively, via one or more antennas 130. In aspects having two or more transceivers 105, the two or more transceivers 105 can have their own antenna 130 or can share a common antenna via, for example, a duplexer and/or diplexer in one or more aspects. In an exemplary aspect, the transceiver 105 (including the transmitter 110 and/or receiver 120) is configured to perform one or more baseband processing functions (e.g., media access control (MAC), encoding/decoding, modulation/demodulation, data symbol mapping; error correction, etc.).

The antenna 130 can include one or more antenna/radiating elements 132 forming an integer array of antenna elements. In an exemplary aspect, the antenna 130 is a phased array antenna that includes multiple radiating elements (antenna elements) each having a corresponding phase shifter. The antenna 130 configured as a phased array antenna can be configured to perform one or more beamforming operations that include generating beams formed by shifting the phase of the signal emitted from each radiating element to provide constructive/destructive interference so as to steer the beams in the desired direction. In some aspects, the antenna elements 132 of the antenna 130 may be activated individually rather than as being part of a phased array.

Figure 2:
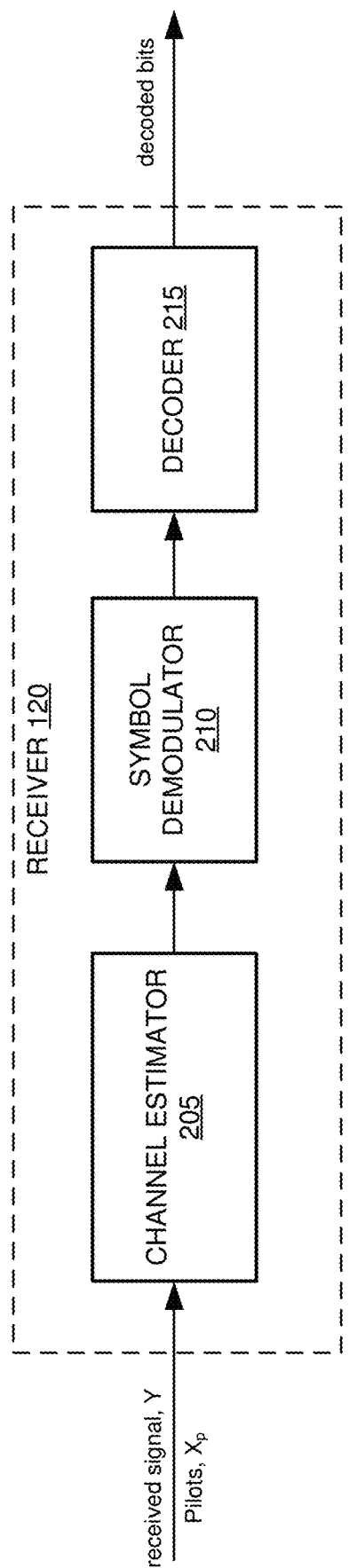
FIG. 2 illustrates a receiver according to exemplary aspects of the present disclosure.

FIG. 2 illustrates an exemplary aspect of receiver 120. In an exemplary aspect, the receiver 120 includes a channel estimator 205, a symbol demodulator 210, and a decoder 215.

The channel estimator 205 is configured to estimate the multipath channel. In an exemplary aspect, the channel estimator 205 is configured to receive, at its input, the received signals, Y (via the antenna 130) and to estimate or otherwise determine channel state information corresponding to channel properties of the communication link (communication channel H). The channel state information may describe how the signal propagates from a transmitting device to the receiver 120. The information may represent the combined effect of, for example, scattering, fading, and power decay with distance. The received signals Y can then be passed to the symbol demodulator 210. In one or more aspects, the channel state information is also provided to the symbol demodulator 210, and/or one or more other components of the receive 120.

The symbol demodulator 210 is configured to perform symbol demodulation to identify the transmitted symbol according to a specified modulation scheme. In an exemplary aspect, the symbol demodulator 210 is configured to receive the received signals Y and to demodulate the received signals Y to generate demodulated signals. The demodulated signals are then provided to the decoder 215. The demodulated signals can include the original information-bearing signal that are extracted from a carrier wave during demodulation. That is, the demodulator 210 can recover the information content from a modulated carrier wave. The demodulator 210 may also generate one or more demodulated symbols X, and provide the demodulated symbols X to the decoder 215 and/or one or more other components of the receiver 120 (e.g. the channel estimator 205).

The decoder 215 is configured to performing channel decoding to decode the data bits according to a coding scheme. In an exemplary aspect, the decoder 215 is configured to decode the demodulated signals to generate an output bit sequence. In an exemplary aspect, the decoder 215 is configured to determine the log-likelihood ratio (LLR) for the bits of the output bit sequence. In an exemplary aspect, the decoder 215 can provide the LLR to one or more other components of the receiver 120 (e.g. the demodulator 210). In an exemplary aspect, the decode 215 is a Low-density parity-check code (LDPC) decoder but is not limited thereto.

One or more aspects of the disclosure may involve the following linear system of equations, where received signal Y can be represented as transmitted bits/symbols X undergoing inter-symbol interference due to the multipath channel H, and is further corrupted by Additive White Gaussian Noise (AWGN)–W. For example, in a MIMO system, Y and W are $N_r$ dimensional vectors, H is $N_r \times N_t$ matrix and X is a $N_t$ dimensional vector wherein $N_t$, $N_r$ are the number of transmit and receive antennas, respectively. Note that Y, H, X, W are all complex Gaussian. Further in a MIMO-OFDM system, this input-output relationship is typically defined for each sub-carrier 'k'. This is illustrated in Equation (1) below:

$$Y = HX + W \qquad (1)$$

From Bayes Theorem, a posterior distribution can be identified for symbol demodulation (Equation 2) and channel estimation (Equation 3) as follows:

$$\text{Symbol demodulation: } P(X|Y, H) = \frac{P(Y|X, H) P(X)}{P(Y)} \qquad (2)$$

$$\text{Channel estimation: } P(H|Y, X) = \frac{P(Y|H, X) P(H)}{P(Y)} \qquad (3)$$

In one or more aspects, the optimization functions may disregard the denominator P(Y) as the functions do not depend on the estimated parameters.

Typically, for symbol demodulation, priors P(X) are from a uniform distribution since all symbols are equally likely. Hence, maximizing the a posteriori probability leads to Maximum Likelihood (ML) solution. However, for channel estimation, priori P(H) also to be maximized, which is a complex Gaussian function of the signal statistics, e.g., channel covariance.

It can be noted that the likelihood distribution is the same for both channel estimation and symbol demodulation:

$$P(Y|X, H) = e^{-\frac{\|Y-HX\|^2}{2\sigma^2}} \qquad (4)$$

For Symbol demodulation, the optimal Maximum Likelihood (ML) solution is set forth in Equation 5:

$$\arg\max_X \log(P(X|Y, H)) \propto \arg\max_X \log(P(Y|X, H)) = \arg\min_X \frac{\|Y - HX\|^2}{2\sigma^2} \qquad (5)$$

For Channel estimation, the optimal Maximum a posteriori (MAP) solution is set forth in Equation 6:

$$\arg\max_H \log(P(X|Y, H)) \propto \arg\max_H \log(P(Y|X, H)) + \log(P(H)) \qquad (6)$$

The receiver 120 may be configured to use the minimization of mean squared error (MMSE) methods for both symbol demodulation and channel estimation. While it is computationally less complex (apart from matrix inverse), MMSE often provides sub-optimal performance for both functions and serve mainly as a baseline for comparison or as an initializer. For symbol demodulation, ML methods may be more preferable while some exhaustive search methods may be less preferable due to prohibitive complexity. Although Sphere decoding for symbol demodulation provides near-ML performance with reasonable complexity in many cases, the complexity becomes more prohibitive with the dimensionality of the search space, especially higher order modulation schemes like 64-QAM (Quadrature amplitude modulation) or 256-QAM. Further, the degree of parallelism possible with sphere decoders is restrictive depending upon the neighborhood QAM symbols search definition (K-closest factor).

In exemplary aspects, the receiver 120 is configured to utilize Probabilistic Computing and/or Machine Learning. For example, communication is a probabilistic inference problem where information bits are estimated from coded data bits in the presence of unknown latent parameters. Since, communication involves the estimation of unobserved transmitted bits (X) from observed signals (Y), maximizing the a posteriori probability P(X|Y) yields the optimal estimate. Bayesian inference offers a solution methodology to this estimation problem, through the formulation of Maximization of a posteriori Probability (MAP) using Likelihood and a priori probabilities.

In an exemplary aspect, the receiver 120 is configured to use one or more Bayesian inference methodologies, including Markov Chain Monte Carlo (MCMC), which is a stochastic approximation, and Variational Inference, which is a deterministic approximation. With MCMC, the receiver 120 is configured such that samples are iteratively drawn from a probability distribution by constructing multiple Markov chains, which eventually converge to an equilibrium distribution proportional to the desired distribution. While MCMC seeks a numerical approximation by sampling the exact posterior, Variational inference provides an analytical solution using the approximate posterior, by using graphical models of observed data, unknown parameters, and latent variables.

In an exemplary aspect, the receiver 120 is configured to use a Metropolis-Hastings (MH) algorithm in the MCMC process. Using MH, candidate samples are generated according to a proposal distribution and are subsequently accepted or rejected according to certain acceptance probabilities. Exploring high dimensional space can be performed effectively through the careful choices of proposal and acceptance distributions. In an exemplary aspect, the receiver 120 can employ Gibbs sampling, which is a special case of the MH algorithm where the exact conditional distribution is used and all samples generated are accepted. In an exemplary aspect, the Gibbs Sampling is used when conditional distributions evaluated for the problem are tractable and simple to compute. When Gibbs sampling is not feasible, the receiver 120 can use a Random walk Metropolis in which the proposal distribution is chosen to be a normal distribution with manually tuned mean and variance. In other cases, the receiver 120 can use one or more gradient methods for the proposal distribution which converge quickly to the equilibrium distribution.

Figure 3:
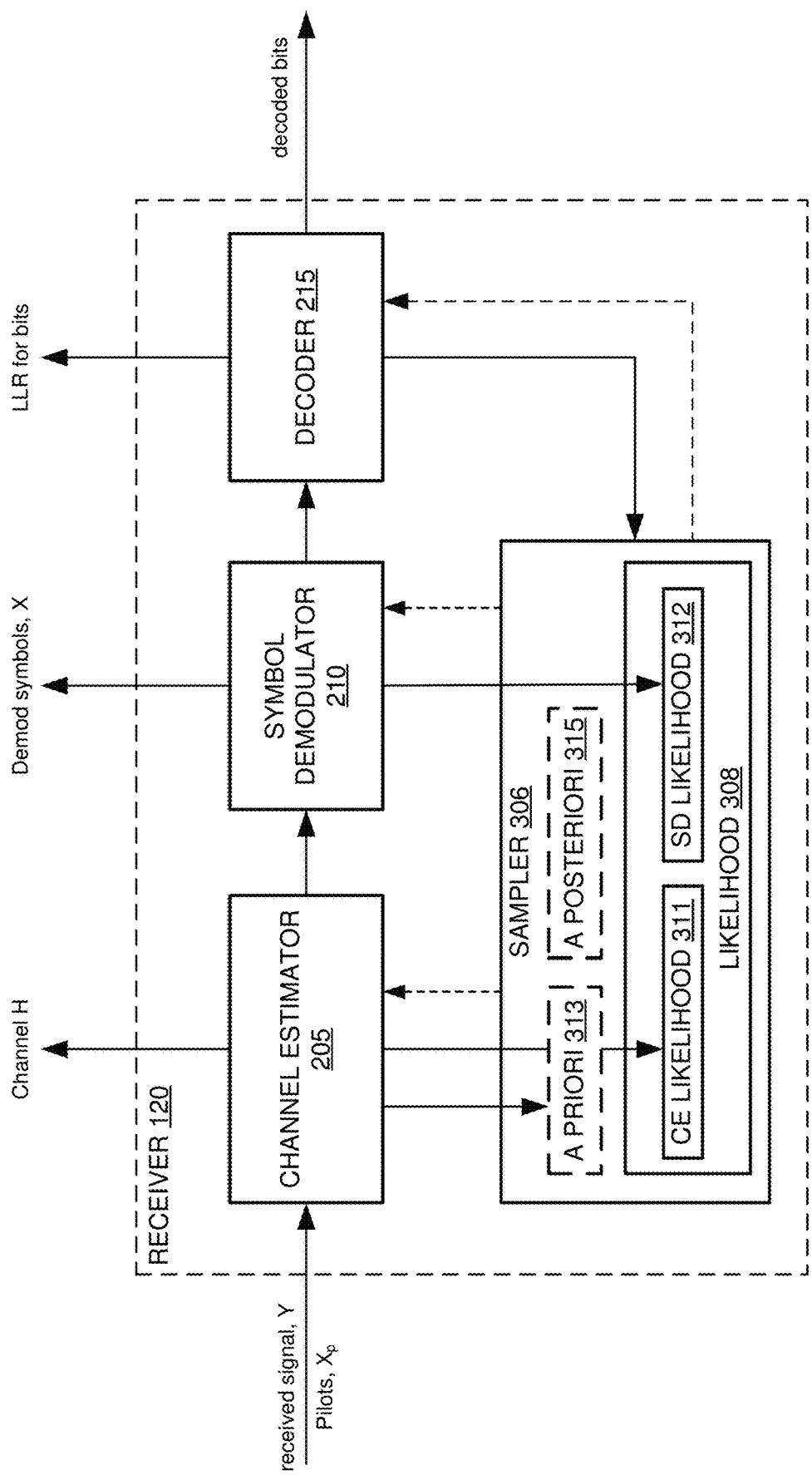
FIG. 3 illustrates a receiver including a sampler according to exemplary aspects of the present disclosure.
Figure 4:
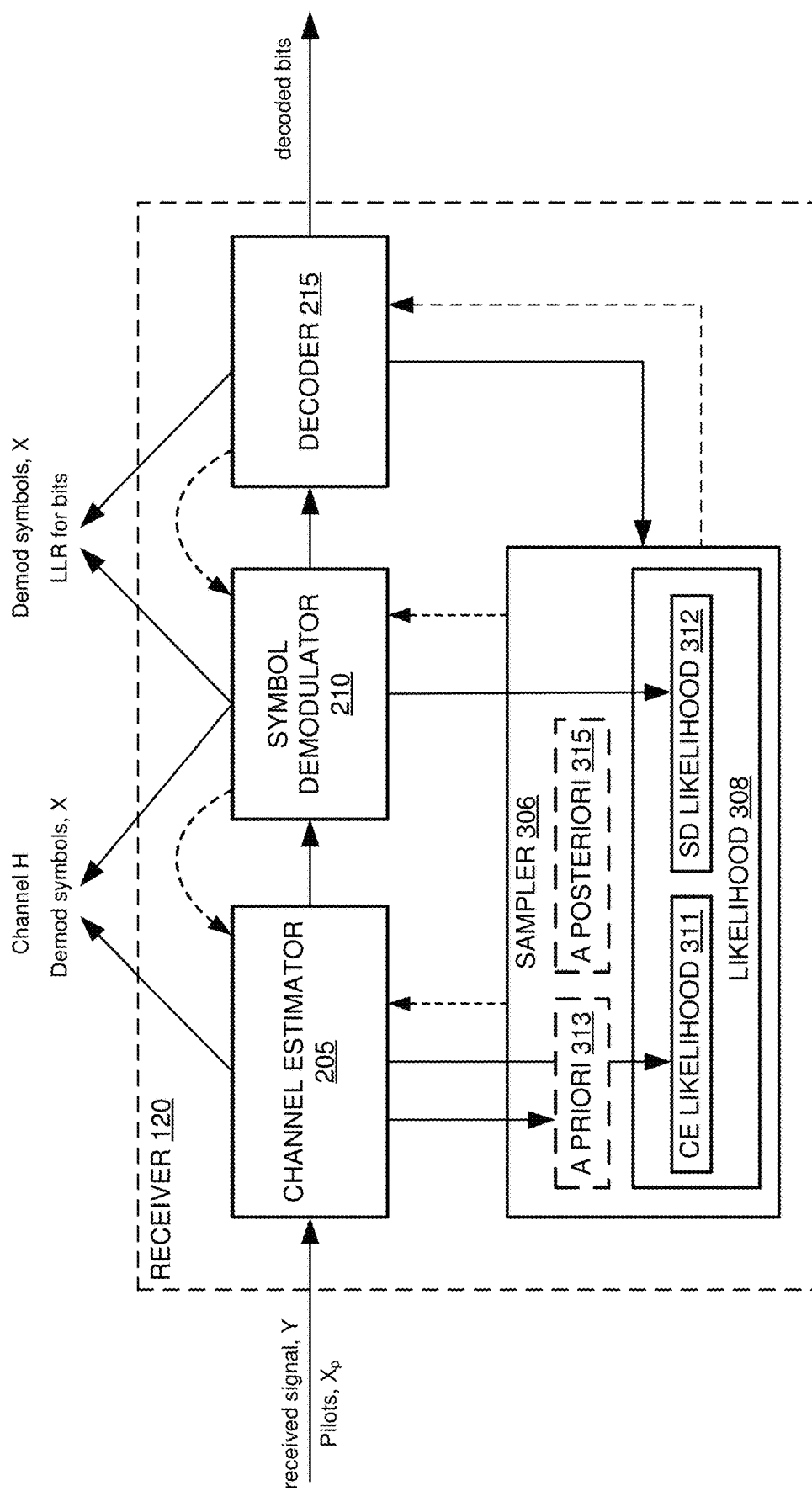
FIG. 4 illustrates a receiver including a sampler according to exemplary aspects of the present disclosure.

In an exemplary aspect, with reference to FIGS. 3 and 4, the receiver 120 may include a sampler 306. In an exemplary aspect, the sampler 306 is a MCMC sampler. The sampler 306 is configured to perform various receiver functionalities efficiently: channel estimation, symbol demodulation and bit decoding. The sampler could operate both in the form of discrete functional modules specific to each functionality (FIG. 3) and also jointly (FIG. 4).

Figure 5:
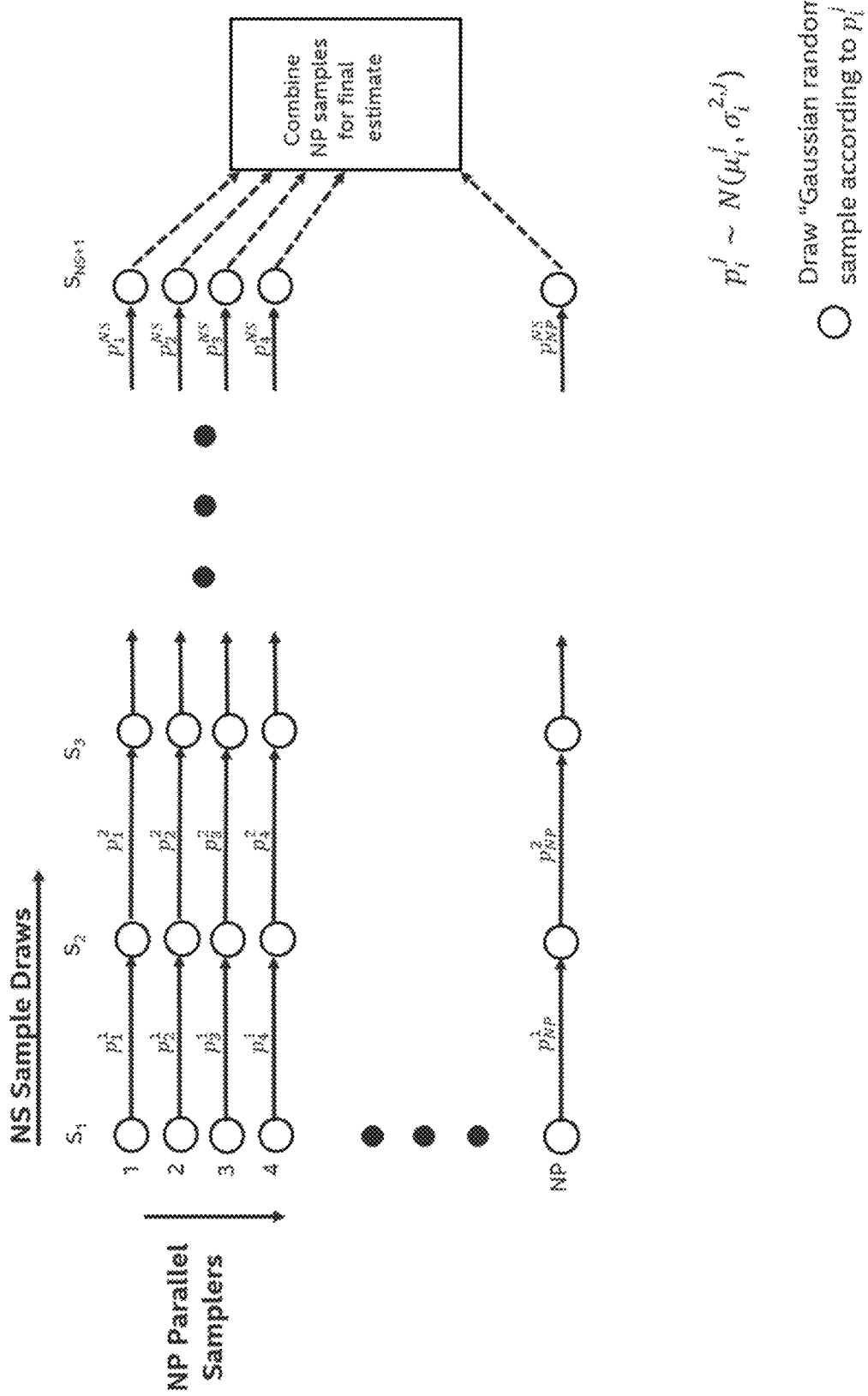
FIG. 5 illustrates a sampling dataflow according to exemplary aspects of the present disclosure.

In an exemplary aspect, the sampler 306 is configured to only maximize terms arising from the likelihood function P(Y|H,X) when configured to perform symbol demodulation. When performing channel estimation, the sampler 306 is configured to consider both likelihood terms and a priori information of the channel deduced from the signal statistics such as the long term channel covariance matrix. In an exemplary aspect, the sampler 306 leverages the probabilistic computing view point of Bayesian inference with appropriate likelihoods and priors to perform multiple functionalities. Although the optimized parameter (X or H) is different for these two modules, Gaussian parameters of the distribution sampled by the sampler 306—mean and variance—are identical in structure. The sampler 306 performs joint sampling to advantageously simplify the processing of latent channel coefficients. An example MCMC sampling dataflow is illustrated in FIG. 5.

There are few differences in the likelihood evaluation for channel estimation and symbol demodulation. In an exemplary aspect, symbol demodulation performs an optimization over a Nt dimension vector X, whereas channel estimation optimizes over a NrxNt linear transformation H. As a result, the sampling structure would be different, which is ultimately dependent on the degree of parallelism in sampling. Also, symbol demodulation is an integer optimization problem since the symbols are from discrete alphabets, whereas channel estimation involves a search over continuous random variables. In an exemplary aspect, despite these two differences, the sampling mean and variance expressions in the likelihood distributions may be performed by the sampler 306 configured with a uniform structure for MCMC sampling.

FIG. 3 illustrates an exemplary aspect of the receiver 120 that includes sampler 306. The sampler 306 includes a likelihood calculator 308 having a channel estimation (CE) likelihood calculator 311 and a symbol demodulation (SD) likelihood calculator 312. In an exemplary aspect, likelihood calculator 308 is configured to calculate or otherwise determine likelihood information based on information received from the channel estimator 205, the symbol demodulator 210, and/or the decoder 215. In an exemplary aspect, the CE likelihood calculator 311 is configured to determine likelihood information for channel estimation based on information received from the channel estimator 205, and the SD likelihood calculator 312 is configured to determine likelihood information for symbol demodulation based on information received from the symbol demodulator 210.

In an exemplary aspect, the sampler 306 may also include an a priori calculator 313 (e.g. as needed for channel estimation (CE)) configured to calculate or otherwise determine a priori information based on signal statistics such as the long term channel characteristics (e.g. channel covariance matrix). In an exemplary aspect, sampler 306 may also include an a posteriori calculator 315 configured to calculate or otherwise determine a posteriori information based on (e.g. a combination of) the likelihood information and the a priori information. In an exemplary aspect, the a posteriori calculator 315 is configured to calculate the a posteriori information based on a product or a sum of the likelihood information and the a priori information, but is not limited thereto.

Similarly, likelihood and a priori modules could be designed for decoding bits in a LDPC or polar decoder. As indicated above, the sampler 306 may be configured in an individual configuration that includes individual functional modules for both channel estimation and symbol demodulation, and a joint configuration that includes joint sampling for channel estimation and symbol demodulation, where the channel is treated as latent variable and only detected symbols are fed as output. In an exemplary aspect, the sampler 306 (or one or more components therein) includes processor circuitry that is configured to perform one or more functions of the sampler 306 (or respective functions of the components).

MCMC-Gibbs Sampling

In an exemplary aspect, the sampler 306 may be configured to perform Gibbs sampling, where the sampler 306 is configured to generate posterior samples by sweeping through each variable to sample from its conditional distribution, by fixing all other variables to their current values. In aspects where random initializers are used, the initial samples generated may not be from the actual posterior distribution and are therefore discarded (called burn-in period, Nb). After substantial iterations, MCMC converges and starts generating samples for each variable from the stationary distribution as desired. In order to perform Gibbs sampling, knowledge of joint or at least the conditional distribution of the variables is necessary. However, manual parameter tuning as applied for other Metropolis-Hastings variants is not needed. In an exemplary aspect, the sampler 306 can use Gibbs sampling to leverage the Gaussian distributions defined using mean and variance, which can be derived for the likelihood and prior distributions. Hence, sampling from the joint posterior distributions is possible.

In an exemplary aspect, the sampler 306, using Gibbs sampling, can break a complex high dimensional symbol search into multiple simple Gaussian sampling of conditionals with tractable mean and variance. As more samples are drawn, conditional distributions are modified accordingly which eventually converge to the stationary distribution. MCMC methods also allow a high degree of parallelism through the construction of multiple independent Markov chains, making them highly amenable to efficient HW implementation. This can also be facilitated in SW implementation by parallelizing MCMC over multiple CPU cores using several threads or using vectorization techniques.

Gibbs Based Channel Estimation

In an exemplary aspect, the sampler 306 is configured to perform MCMC-based channel estimation utilizes the channel covariance to account for channel a priori. In an exemplary aspect, the sampler 306 is configured to model a priori distribution using appropriate channel covariance matrices and may use a shared hardware configuration as with symbol demodulation based on sampling from similar likelihood distributions.

In an exemplary aspect, channel coefficients h in Equation 7 are assumed to complex Gaussian with zero mean and covariance Σ across all the subcarriers. In an exemplary aspect, the full covariance is considered for obtaining optimal performance. In another aspect, a block-based local covariance (e.g. 12 or 24 subcarriers) is used to reduce computations. Considering 12 subcarriers, referred as one Resource Block—RB, Σ is a 12×12 complex valued matrix.

$$h \sim CN(h; 0, \Sigma) \qquad (7)$$

where CN denotes complex Gaussian distribution.

A MAP solution for MIMO channel estimation as defined in Equation (6) involves the product of 2 complex Gaussian distributions with (mean, variance) defined as $(\mu_1, \sigma_1^2)$ for the likelihood distribution and $(\mu_2, \sigma_2^2)$ for the a priori distribution, which can be calculated as follows.

$$h_{j,i}(k) \sim CN(h; \mu, \sigma^2) = CN(h; \mu_1, \sigma_1^2) \times CN(h; \mu_2, \sigma_2^2) \qquad (8)$$

where $h_{j,i}(k)$ refers to the channel coefficient between transmit antenna i and receive antenna j.

A MCMC-Gibbs Sampling method for Channel Estimation according to an exemplary aspect is illustrated by the following flow structure:

For np = 1: $N_p$
   1. Initialize $h_1, h_2, ..., h_{N_rN_t}$ randomly or use MMSE estimates
   2. For s = $-N_b$ + 1 to $N_s$
     • For sc = 1:Num__Subcarriers__block
       ○ draw sample $h_1^{(s,sc)}$ from $p(h_1^{(s)}|h_2^{(s-1)}, h_3^{(s-1)}, ..., h_{N_rN_t}^{(s-1)}, Y, X)$
       ○ draw sample $h_2^{(s,sc)}$ from $p(h_2^{(s)}|h_1^{(s)}, h_3^{(s-1)}, ..., h_{N_rN_t}^{(s-1)}, Y, X)$
       ○ ...
       ○ draw sample $h_{N_rN_t}^{(s,sc)}$ from $p(h_{N_rN_t}^{(s)}|h_1^{(s)}, ..., h_{N_rN_t-1}^{(s-1)}, Y, X)$
     • End
    End
End In the structured flow, $N_p$ is the number of parallel MCMC samplers, $N_s$ is the number of sample draws and $N_b$ is the number of initial burn-in samples discarded. Superscript sc denoting subcarrier index is omitted from all channel variables above for ease of exposition. In an exemplary aspect, for each MCMC sampler, MMSE initialization is used due to the performance and quicker convergence to optimal solution.

Figure 6:
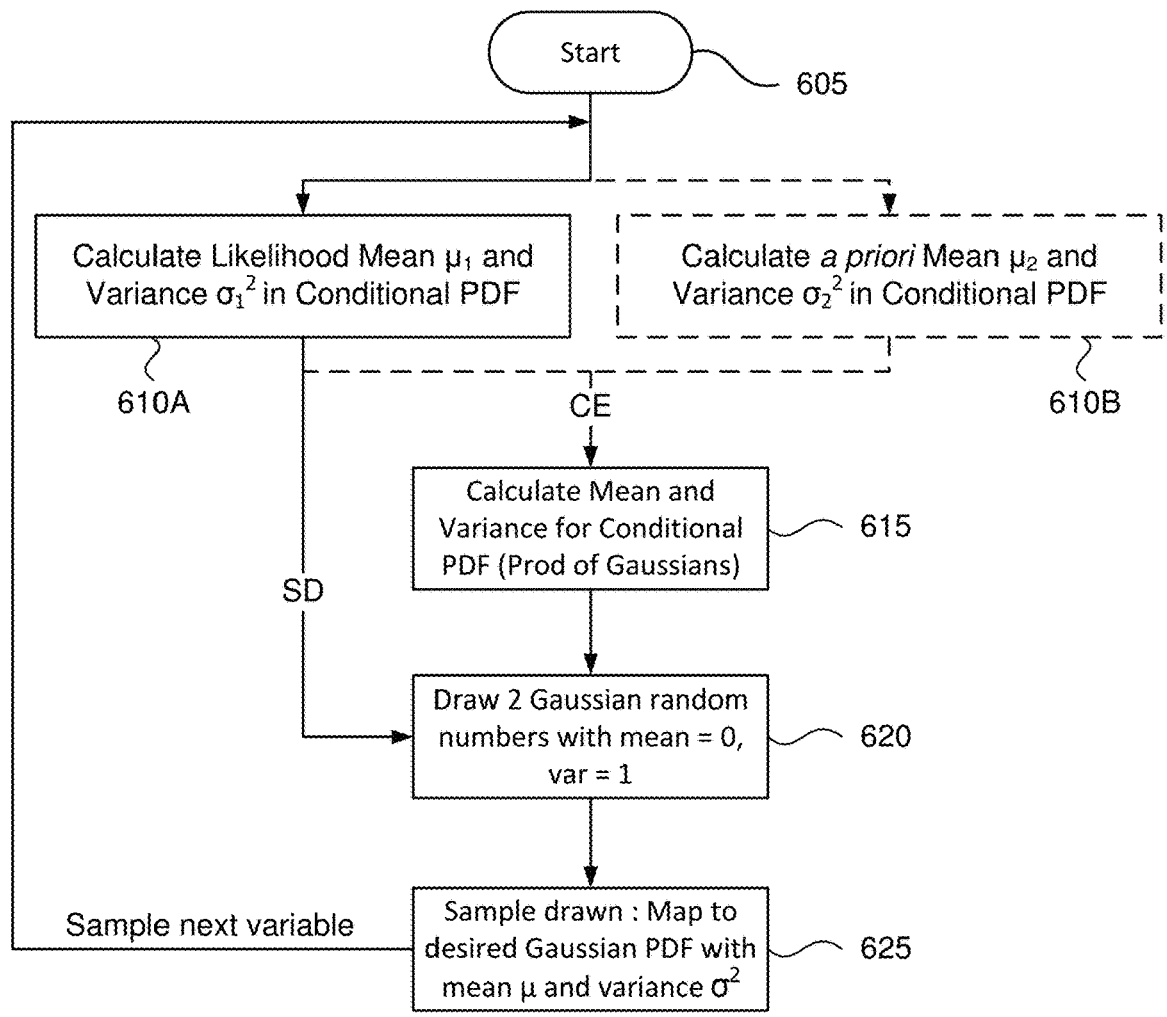
FIG. 6 is a flowchart of a sampling method according to an exemplary aspect of the present disclosure.

FIG. 6 illustrates two flowcharts 600 and 601. Flowchart 600 illustrates a MCMC-Gibbs Sampling method for Channel Estimation according to an exemplary aspect. Flowchart 601 illustrates a MCMC-Gibbs Sampling method for Symbol demodulation according to an exemplary aspect. In the flowchart 600, both operations 610A and 610B are performed for channel estimation, and the flowchart 600 illustrates an exemplary sample draw procedure for the above Gibbs algorithm for Channel Estimation flow structure.

The flowchart 600 starts at operation 605 and transitions to operation 610 (both 610A and 610B in this aspect). Both operations 610A and 610B are performed in the MCMC-Gibbs Sampling method for Channel Estimation flow structure (algorithm). In operation 610A, the Likelihood Mean $\mu_1$ and Variance $\sigma_1^2$ in the Conditional PDF (probability density function) is calculated.

In an exemplary aspect, the likelihood distribution for channel estimation is identified by optimizing for H using Equations (4) and (6) with mean and variance defined as follows in Equation (9).

$$\mu_1 = \frac{X_k^*(n)\left(Y_j(n) - \sum_{i \ne k}^{Nt} h_{ji}(n)X_i(n)\right)}{|X_k(n)|^2} \text{ and } \sigma_1^2 = \frac{\sigma_n^2}{|X_k(n)|^2} \qquad (9)$$

Advantageously, given the similarity in structure with symbol demodulation Gibbs sampling as shown in Equation (9) and (11), the aspects of the present disclosure may utilize a shared HW or SW configuration. For example, the only differences are the $N_r$ dimensional vector multiplications in Equation (11) replaced with a scalar symbol. Advantageously, the sampler 306 may be configured to adapt to these differences with minimal overhead.

In an exemplary aspect, mean and variance calculation logic (HW or SW) for likelihood distribution is shared between channel estimation and symbol demodulation, as shown above.

In another exemplary aspect, the sampler 306 makes use of results on partitioned Gaussians in order to calculate mean and variance of the a priori distribution of H using channel covariance matrix $\Sigma$, which is illustrated below in Equation set (10).

$$\mu_2 = \sum_{h_{j,i}(n), h_{j,i}(\neq n)} \sum_{h_{j,i}(\neq n), h_{j,i}(\neq n)}^{-1} h_{j,i}(\neq n) \quad (10)$$

$$\sigma_2^2 = \sum_{h_{j,i}(n), h_{j,i}(n)} - \sum_{h_{j,i}(n), h_{j,i}(\neq n)} \sum_{h_{j,i}(\neq n), h_{j,i}(\neq n)}^{-1} \sum_{h_{j,i}(\neq n), h_{j,i}(n)}$$

Note than "n" signifies consideration of only row or column corresponding to subcarrier "n", whereas "≠n" signifies consideration of rows or columns corresponding to all subcarriers except subcarrier "n".

After operation 610 (610A and 610B), the flowchart 600 transitions to operation 615, where Mean and Variance for Conditional PDF (Product of Gaussians) is calculated. In an exemplary aspect, the mean $\mu$ and variance $\sigma^2$ calculated based on the following equations:

$$\mu = \frac{\mu_1 \sigma_2^2 + \mu_2 \sigma_1^2}{\sigma_1^2 + \sigma_2^2} \text{ and } \sigma^2 = \frac{\sigma_{12} \sigma_2^2}{\sigma_{12} + \sigma_2^2}$$

After operation 615, the flowchart 600 transitions to operation 620, where two Gaussian random numbers with mean=0, variance=1 are drawn, denoted as $\varphi$ and $\psi$.

After operation 620, the flowchart 600 transitions to operation 625, where the drawn samples are mapped to the desired Gaussian PDF with mean $\mu$ and variance $\sigma^2$. In an exemplary aspect, the mapping is based on the following equation:

$$H = \{\Re(\mu) + \sigma \cdot \varphi\} + i\{\Im(\mu) + \sigma \cdot \psi\}$$

Where $\Re(\mu)$, $\Im(\mu)$ refer to real and imaginary parts of mean $\mu$ respectively, $\varphi$ and $\psi$ are zero-mean unit-variance Gaussian random numbers and i denotes the complex imaginary number.

After operation 625, the flowchart 600 returns to operation 610 to sample the next variable.

Advantageously, in an exemplary aspect, the arithmetic computation may be simplified in Equation 10 because variance term $\sigma_2^2$ can be precomputed for all subcarriers. Also product of vector and matrix $$\sum_{h_{j,i}(n), h_{j,i}(\neq n)} \sum_{h_{j,i}(\neq n), h_{j,i}(\neq n)}^{-1}$$

present in both mean and variance expressions can be precomputed once for all subcarriers. Further matrix inverse $$\sum_{h_{j,i}(\neq n), h_{j,i}(\neq n)}^{-1}$$

unique for each subcarrier does not involve multiple matrix inverse computations. Instead, inverse of the covariance matrix $\Sigma$ (or block covariance considered) is calculated once and rank-one updates are used to calculate other inverses of submatrices constructed with specific row and column removed. Due to these optimizations, MCMC based Gibbs Sampling for channel estimation by the sampler 306 is highly optimal and is amenable to parallel hardware or software implementation with high efficiency and reusability.

Gibbs Based Symbol Demodulation

In an exemplary aspect, the sampler 306 is configured to perform MCMC-Gibbs sampling for MIMO symbol demodulation.

A MCMC-Gibbs Sampling method for Symbol Demodulation according to an exemplary aspect is illustrated by the following flow structure:

- For np = 1: $N_p$
  - Initialize $x_1, x_2, ..., x_{N_t}$ randomly or use MMSE estimates
  - For s = $-N_b + 1$ to $N_s$
    - draw sample $x_1^{(s)}$ from $p(x_1^{(s)}|x_2^{(s-1)}, x_3^{(s-1)}, ..., x_{N_t}^{(s-1)}, Y, H)$
    - draw sample $x_2^{(s)}$ from $p(x_2^{(s)}|x_1^{(s)}, x_3^{(s-1)}, ..., x_{N_t}^{(s-1)}, Y, H)$
    - ...
    - draw sample $x_{N_t}^{(s)}$ from $p(x_{N_t}^{(s)}|x_1^{(s)}, x_2^{(s-1)}, ..., x_{N_t-1}^{(s-1)}, Y, H)$
  - End
- End In above algorithm, $N_s$ denotes the number of MCMC sample draws, $N_b$ denotes the burn-in period, and $N_p$ denote the number of MCMC samplers operating in parallel. In an exemplary aspect, for each MCMC sampler, MMSE initialization is used due to the performance and quicker convergence to optimal solution.

Again with reference to FIG. 6, flowchart 601 of a MCMC-Gibbs Sampling method according to an exemplary aspect is illustrated. In flowchart 601, operation 610A is selected for Symbol demodulation, and the flowchart 601 illustrates an exemplary draw procedure for the above Gibbs algorithm for Symbol demodulation structure flow. In this aspect, operation 610B is not performed, and the flow skips operation 615.

Again, the flowchart 601 starts at operation 605 and transitions to operation 610 (Only 610A in this aspect). Only operation 610A is performed in the MCMC-Gibbs Sampling method for Symbol demodulation flow structure (algorithm). In Operation 610A, the Likelihood Mean $\mu=\mu_1$ and Variance $\sigma^2=\sigma_1^2$ in Conditional PDF are calculated based on Equation (5), as follows $$\mu = \frac{\sum_{j=1}^{Nr} h_{jk}^*(n)\left(Y_j(n) - \sum_{i \neq k}^{NC} h_{ji}(n)X_i(n)\right)}{\sum_{j=1}^{Nr} |h_{jk}(n)|^2} \text{ and} \quad (11)$$

$$\sigma^2 = \frac{\sigma_n^2}{\sum_{i=1}^{Nr} |h_{jk}(n)|^2}$$

After operation 610A, the flowchart 601 transitions to operation 620, where two Gaussian random numbers with mean=0, variance=1 are drawn, denoted as φ and ψ. That is, unlike in the channel estimation method, operation 615 is omitted.

After operation 620, the flowchart 601 transitions to operation 625, where the drawn samples are mapped to the desired Gaussian PDF with mean μ and variance $\sigma^2$. Note that the mean and variance expressions are similar in structure to those for Channel estimation in Equation (9). This advantageously enables a re-usable hardware design in various respects. After calculating the mean and variance that defines the conditional Gaussians, samplers are generated from the distribution according to Equation (12):

$$\widetilde{X}_i = \{\Re(\mu) + \sigma \times \varphi\} + i\{\Im(\mu) + \sigma \times \psi\} \qquad (12)$$

where $\Re(\mu)$, $\Im(\mu)$ refer to real and imaginary parts of mean μ respectively, φ and ψ are zero-mean unit-variance Gaussian random numbers and i denotes the complex imaginary number.

After operation 625, the flowchart 601 returns to operation 610 to sample the next variable.

In an exemplary aspect, for symbol demodulation, samples drawn from the conditionals are then mapped onto the closest QAM constellation point according to Equation (13) as below. This advantageously is a simple slicing operation in hardware.

$$X_i = \operatorname{argmin}(\widetilde{X}_i, Q) \qquad (13)$$

Where Q refers to the set of possible discrete QAM modulated symbols. MCMC Gibbs Sampling algorithm continues to iterate for $N_s$ sample draws across $N_p$ parallel samplers, so as to converge to the stationary distribution.

In another exemplary aspect, variance calculated in Equation 11 is amended to improve performance at high SNR and avoid stalling. To be specific, variance is updated to be the maximum of the variance calculated in Equation 11 and half of the minimum distance between QAM symbols. This enables a wider search radius at high SNR scenarios, thus avoiding the sampler from getting stuck at local optima.

In an exemplary aspect, for symbol demodulation, the sampler 306, configured as a Gibbs sampler, is configured with, for example, 8 or 16 sample draws for each of the, for example, 8 or 16 parallel samplers (although optimal ML solution could be obtained with much less sampling). Advantageously, the MCMC-Gibbs provides near-ML performance like sphere decoder, but increases the parallelism factor (thereby reducing latency) while having negligible or no complexity increase when the order of modulation schemes is increased.

Gibbs Sampling for Joint Channel Estimation and Symbol Demodulation

In an exemplary aspect, the MCMC sampler 306 is configured to perform joint sampling for Channel Estimation and Symbol demodulation, where both channel coefficients and symbols are drawn using corresponding conditional distributions. Channel coefficients are treated as latent variables and are discarded at the end, while symbols detected are fed as the final output. A MCMC-Gibbs Sampling process flow (e.g. algorithm) for joint sampling according to an exemplary aspect is provided below:

- For np = 1: $N_p$
  - Initialize $h_1, h_2, ..., h_{N_rN_t}, x_1, x_2, ..., x_{N_t}$ randomly or use MMSE estimates
  - For s = $-N_b + 1$ to $N_s$
    - For sc = 1:Num_Subcarriers_block
      - draw sample $h_1^{(s,sc)}$ from
        $p(h_1^{(s)}|h_2^{(s-1)}, h_3^{(s-1)}, ..., h_{N_rN_t}^{(s-1)}, Y, X^{(s)})$
      - draw sample $h_2^{(s,sc)}$ from $p(h_2^{(s)}|h_1^{(s)}, h_3^{(s-1)}, ..., h_{N_rN_t}^{(s-1)}, Y, X)$
      - ...
      - draw sample $h_{N_rN_t}^{(s,sc)}$ from $p(h_{N_rN_t}^{(s)}|h_1^{(s)}, ..., h_{N_rN_t-1}^{(s)}, Y, X)$
      - draw sample $x_1^{(s,sc)}$ from $p(x_1^{(s)}|x_2^{(s-1)}, ..., x_{N_t}^{(s-1)}, Y, h^{(s)})$
      - draw sample $x_2^{(s,sc)}$ from $p(x_2^{(s)}|x_1^{(s)}, x_3^{(s-1)}, ..., x_{N_t}^{(s-1)}, Y, H)$
      - ...
      - draw sample $x_{N_t}^{(s,sc)}$ from $p(x_{N_t}^{(s)}|x_1^{(s)}, x_2^{(s)}, ..., x_{N_t-1}^{(s)}, Y, H)$
    - End
  - End
- End Sample draw for channel estimate H entails performing operations 605-625 according to flowchart 600 as described above while sample draw for symbol demodulation X entails performing operations 605-625 according to flowchart 601 as described above.

Advantageously, by ignoring the latent channel variables, post processing for channel estimation may be avoided, and better performance can be obtained since this approach optimizes the joint distribution considering both types of conditional distributions.

MCMC—Metropolis Hastings (MH) Sampling

In many Bayesian inference problems, the exact posterior conditional may be intractable or difficult to compute, which may make Gibbs based sampling infeasible. In an exemplary aspect, in such cases, Metropolis-Hastings sampling may be used to sample from the target distribution. An outline of the Metropolis-Hastings process flow (algorithm) for symbol demodulation according to an exemplary aspect is provided below:

For np = 1 to $N_p$
  Initialize $x_1, x_2, ..., x_{N_t}$ randomly or use MMSE estimates
  For s = $-N_b + 1$ to $N_s$
    For n = 1 to $N_t$
      Propose sample $x_n^{(cand)}$ according to $q(x_n^{(s)}|x_n^{(s-1)})$
      Calculate acceptance probability as $\alpha(x_n^{(cand)} | x_n^{(s-1)}) = \min\left\{1, \dfrac{\pi(x_n^{(cand)})}{\pi(x_n^{(s-1)})}\right\}$ Draw uniform random variable u = Uniform(0,1)
      If u < α then

```
        Accept the proposal: x_n^(s) = x_n^(cand)
    Else
        Reject the proposal: x_n^(s) = x_n^(s-1)
    End
  End
End
```

In the Metropolis-Hastings sampling method, $q(x_n^{(s)}|x^{(s-1)})$ denotes the proposal density and $\pi(x_n^{(s)})$ is the target posterior density.

In an exemplary aspect, in Metropolis-Hastings, samples are iteratively generated from a proposal distribution, which could be a normal distribution with manually tuned mean and variance. Samples are accepted or rejected depending upon certain acceptance ratio, which indicates how likely the new sample is probable as compared to the previous accepted sample. Metropolis-Hastings algorithm constructs a Markov chain, which asymptotically reaches a unique stationary distribution. When the proposal density is symmetric, acceptance ratio further simplifies to just check if new sample is more likely than the old sample for acceptance.

Proposal distribution choice effects the performance of MH algorithm. For example, small jumps or low variance cause the algorithm to mix slowly since successive samples move around the search space too slowly. Large jumps or high variance causes samples to be chosen from the low probability region often leading to slow convergence. In an exemplary aspect, optimal convergence requires a careful choice of proposal distribution considering the nature of problem at hand. Random-walk metropolis suffers from the need to manually tune mean and variance, due to which algorithm designs are not scalable. Therefore, in an exemplary aspect, gradient based methods are preferable for choosing proposal distribution where tractable gradients can be computed with less complexity.

MH-GD Based Channel Estimation

In an exemplary aspect, the sampler 306 is configured as a gradient-descent based Metropolis-Hastings sampler for both communication tasks of channel estimation and symbol demodulation. In an exemplary aspect, the first derivative (Gradient) of an error function, such as the Negative of Log Posterior (NLP, deduced from Equation (6)), or of a loss function, is used as the mean of proposal move, and its second derivative (Hessian) as the variance of the proposal move. Advantageously, the MH-GD sampler enables MCMC sampling with faster convergence compared to Gibbs sampling.

In MH-GD channel estimation, the gradient descent direction is first identified using the NLP function for Channel estimation, from two Gaussian distributions corresponding to likelihood and a priori.

In an exemplary aspect, to define the proposal distribution $q(h^{(s)}|h^{(s-1)})$, the proposal walk $(h^{(s)}-h^{(s-1)})$ is calculated by generating Gaussian random numbers and making a move in the direction of the gradient and variance is defined using maximum of the inverse of Hessian and half of minimum distance between QAM symbols. NLP provides a cost function that helps define the target distribution $\pi(h_n^{(cand)})$, which is used to calculate the acceptance probability. The proposed channel sample is then accepted or rejected.

The Gradient-descent based Metropolis-Hastings sampling algorithm for channel estimation according to an exemplary aspect is provided in the process flow below.

```
For np = 1 to N_p
    Initialize h_1, h_2, ..., h_{N_r N_t} randomly or use MMSE estimates
    For s = -N_b + 1 to N_s
        For n = 1 to N_r N_t
            Propose sample h_n^(cand) according to q(h^(s)|h^(s-1))
            Calculate acceptance probability as
```

$$\alpha\left(h_n^{(cand)} \mid h_n^{(s-1)}\right) = \min\left\{1, \frac{\pi\left(h_n^{(cand)}\right)}{\pi\left(h_n^{(s-1)}\right)}\right\}$$

```
            Draw uniform random variable u = Uniform(0,1)
            If u < α then
                Accept the proposal: h_n^(s) = h_n^(cand)
            Else
                Reject the proposal: h_n^(s) = h_n^(s-1)
            End
        End
    End
End
```

Figure 7:
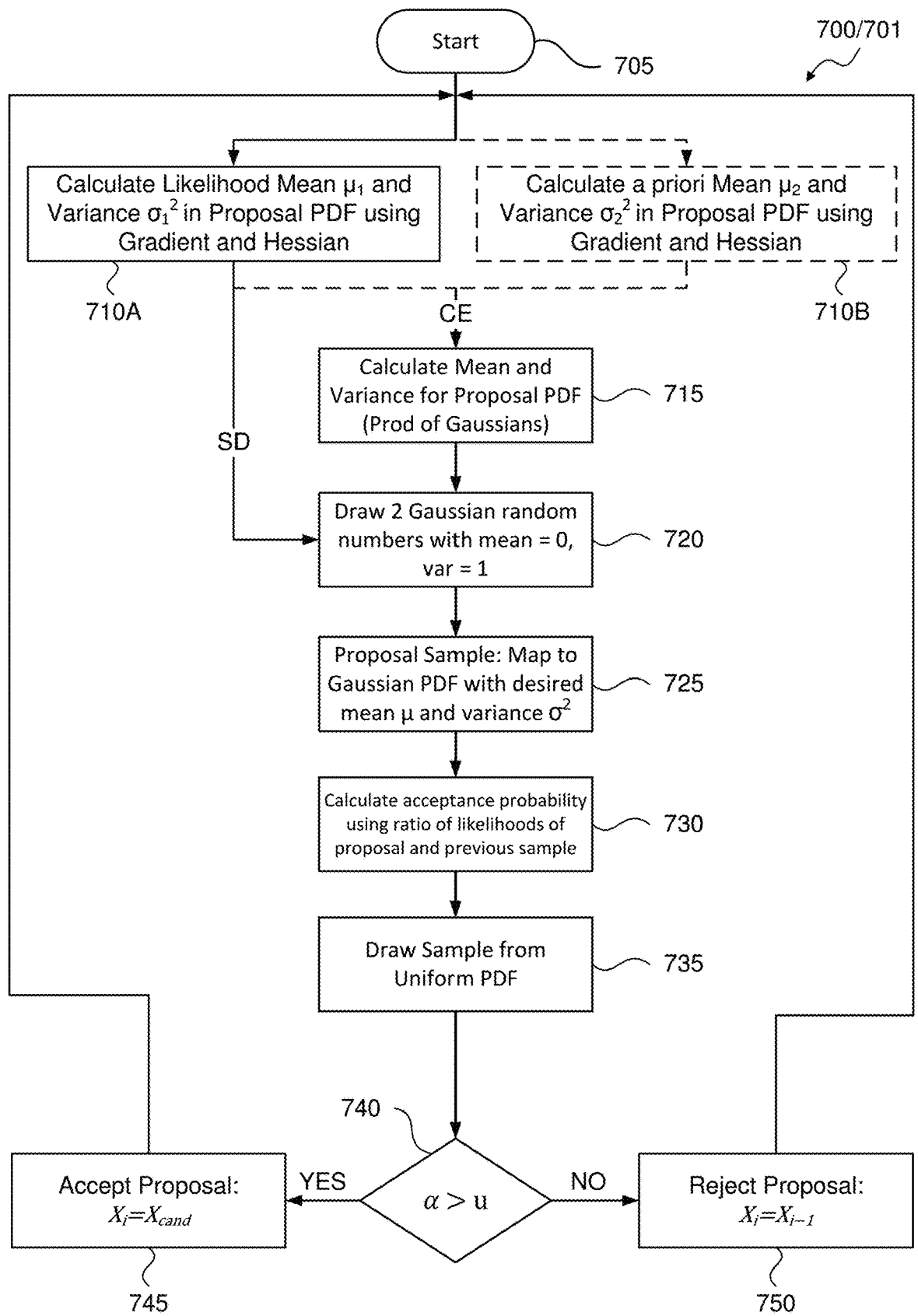
FIG. 7 is a flowchart of a sampling method according to an exemplary aspect of the present disclosure.

A corresponding flowchart 700 that illustrates a MCMC MH-GD channel estimation method is discussed below with reference to FIG. 7. FIG. 7 illustrates two flowcharts 700 and 701. Flowchart 700 illustrates a MCMC MH-GD Sampling method for Channel Estimation according to an exemplary aspect. Flowchart 701 illustrates a MCMC MH-GD Sampling method for Symbol demodulation according to an exemplary aspect.

First with reference to FIG. 7 for a MCMC MH-GD channel estimation method, the flowchart 700 is described for Channel Estimation (both operations 710A and 710B). That is, when operations 710A and 710B are selected, and the flowchart 700 is applied to channel estimation, and the flowchart 700 illustrates an exemplary sample draw procedure for the above MH-GD algorithm for Channel Estimation structure flow discussed above.

The flowchart 700 starts at operation 705 and transitions to operation 710 (both 710A and 710B in this aspect). Both operations 710A and 710B are performed in the MCMC MH-GD Sampling method for Channel Estimation flow structure (algorithm).

In operation 710A and 710B, the Likelihood Mean $\mu_1$ and Variance $\sigma_1^2$ and a priori Mean $\mu_2$ and Variance $\sigma_2^2$ in Proposal PDF are calculated using the Gradient and the Hessian of cost function used in Gibbs sampling. In an exemplary aspect, the mean value of the update is obtained from the Gradient, identified as $$\frac{h-\mu_1}{\sigma_1^2} + \frac{h-\mu_2}{\sigma_2^2}$$

where $(\mu_1, \sigma_1^2)$ and $(\mu_2, \sigma_2^2)$ are the Gaussian (mean, variance) of likelihood and a priori distributions, respectively, as identified for Gibbs sampling in Equations (9) and (10) for Gibbs-based channel estimation. While the gradient is used for mean, variance may be deduced from the inverse of Hessian (second derivative of NLP), i.e., inverse of $$\frac{1}{\sigma_1^2} + \frac{1}{\sigma_2^2}.$$

After operation 710 (710A and 710B), the flowchart 700 transitions to operation 715, where Mean and Variance for Proposal PDF (Product of Gaussians) is calculated. In an exemplary aspect, the mean $\mu$ and variance $\sigma^2$ calculated based on the following equations:

$$\mu = \frac{\mu_1 \sigma_2^2 + \mu_2 \sigma_1^2}{\sigma_1^2 + \sigma_2^2} \text{ and } \sigma^2 = \frac{\sigma_{12}\sigma_2^2}{\sigma_{12} + \sigma_2^2}$$

After operation 715, the flowchart 700 transitions to operation 720, where two Gaussian random numbers with mean=0, variance=1 are drawn, denoted as φ and ψ.

After operation 720, the flowchart 700 transitions to operation 725, where the drawn samples are mapped to the desired Gaussian PDF with mean μ and variance $\sigma^2$. In an exemplary aspect, the mapping is based on the following equation:

$$H_{cand} = \{\Re(\mu) + \sigma \cdot \varphi\} + i\{\Im(\mu) + \sigma \cdot \psi\}$$

$\Re(\mu)$, $\Im(\mu)$ refer to real and imaginary parts of mean μ respectively, φ and ψ are zero-mean unit-variance Gaussian random numbers and i denotes the complex imaginary number.

After operation 725, the flowchart 700 transitions to operation 730, where the acceptance probability is calculated using the ratio of likelihoods of proposal and the previous sample.

In an exemplary aspect, the acceptance probability is calculated according to the following equation:

$$\alpha = \min\left(\frac{|Y - H_{cand}X|^2}{|Y - H_{i-1}X|^2}\right)$$

$H_{cand}$ denotes the candidate channel estimate calculated in operation 725 and $H_{i-1}$ denotes the channel estimate in previous sample draw/iteration for same variable index. Y refers to the received signal and X denotes the transmitted symbol, typically a pilot sequence.

After operation 730, the flowchart 700 transitions to operation 735, where the sample is drawn from Uniform PDF. For example, the operation includes drawing a uniform random variable u. In an exemplary aspect, the sample draw corresponds to the equation below:

$$u \in U(0, 1)$$

After operation 735, the flowchart 700 transitions to operation 740, where it is determined if α>u. This determination can include a comparison of α with u.

If u is less than α, the flowchart 700 transitions to operation 745, where the proposal is accepted ($H_i=H_{cand}$).

If u is greater than or equal to α, the flowchart 700 transitions to operation 750, where the proposal is rejected ($H_i=H_{i-1}$).

After operations 745 and 750, the flowchart 700 returns to operation 710 to sample the next variable.

Advantageously, as compared to Gibbs sampling or Random-walk Metropolis, the Gradient-descent based MH algorithm, according to exemplary aspects, converges rather quickly to the stationary distribution. As a result, with the MH-GD algorithm, fewer sample draws and parallel samplers are sufficient to get superior performance. Further, with the MH-GD algorithm, using the direction of the gradient improves the generation of samples to increase the number of samples in the high probability region than the tails, which leads to better understanding of the target distribution. Further, since sample variance adapts to the Hessian (curvature of the cost function), large incorrect jumps are avoided and only the right moves get accepted. The MH-GD algorithm is also highly parallelizable with minimal computations per sample draw, making it highly amenable to hardware implementation. Therefore, this Bayesian receiver according to exemplary aspects is configured to support the multiple MCMC sampling configurations to enable better trade-off of performance and complexity.

MH-GD Based Symbol Demodulation

For symbol demodulation, we have identified the mean of the update as the gradient given by H'(Y–HX). Here, vector-level random walk is adopted by stacking $N_t$ transmit symbols as a vector X. Also, a positive-definite preconditioner matrix similar to the one used for MMSE $(H'H+\sigma_n^2 I)^{-1}$ is used to steer the walk along the right gradient. Note that $\sigma_n^2$ denotes the measured noise variance in specific receiver antenna. After using gradient as the mean for proposal change, variance can be deduced as inverse of the Hessian ($2^{nd}$ derivative) as G=inv(H'H). Further, columns of this inverse matrix G are normalized to 1. In an exemplary aspect, proposals for samples are generated using Gaussian random numbers as shown in Equation (14):

$$\overline{X}_i = X_{i-1} + (H'H + \sigma_n^2 I)^{-1} H'(y - HX) + k.sqrt(G)R \quad (14)$$

R denotes a Nt dimensional vector of complex Gaussian random numbers and k is a constant.

Similar to the MH-GD algorithm for channel estimation, acceptance probability is calculated using NLP of target posterior distribution, which is same as likelihood function, given as norm of |Y–HX|. Proposed symbols are either accepted or rejected according to (see FIG. 7). Detailed MH-GD algorithm for Symbol demodulation is outlined below.

```
For np = 1 to N_p
    Initialize x_1, x_2, . . . , x_{N_t} randomly or use MMSE estimates
    For s = − N_b + 1 to N_s
        For n = 1 to N_t
            Propose sample x_n^{(cand)} according to q(x^{(s)}|x^{(s-1)})
            Calculate acceptance probability as
            α(x_n^{(cand)} | x_n^{(s-1)}) = min{1, π(x_n^{(cand)})/π(x_n^{(s-1)})}
            Draw uniform random variable u = Uniform(0,1)
            If u < α then
                Accept the proposal: x_n^{(s)} = x_n^{(cand)}
            Else
                Reject the proposal: x_n^{(s)} = x_n(s-1)
            End
        End
    End
```

Similar to MH-GD channel estimation, usage of gradient and hessian helps the MH-GD symbol demodulation algorithm to converge faster as well. Hence, BER results show remarkable improvement with MH-GD even with small number of sample draws and parallel samplers.

Again with reference to FIG. 7, flowchart 701 illustrates a MCMC MH-GD sampling method for Symbol Demodulation according to an exemplary aspect. In flowchart 701, operation 710A is selected for Symbol demodulation, and the flowchart 701 illustrates an exemplary draw procedure for the above MH-GD algorithm for Symbol demodulation structure flow. In this aspect, operation 710B is not performed, and the flow skips operation 715.

Again, the flowchart 701 starts at operation 705 and transitions to operation 710 (only 710A in this aspect). Only operation 710A is performed in the MCMC MH-GD Sampling method for Symbol demodulation flow structure (algorithm). That is, operation 710B is omitted.

In Operation 710A, Mean and Variance for Proposal PDF is calculated. In an exemplary aspect, the vector mean μ and variance $\sigma^2$ are deduced from the Gradient and the Hessian as follows:

$$\mu = X_{i-1} + (H'H + \sigma_n^2 I)^{-1} H'(y - HX_{i-1}) \text{ and } \sigma^2 = k^2 G$$

wherein G=inv(H'H), inverse of the Hessian matrix column-normalized to 1 and k=max(|Y−HX$_{i-1}$|, Q_d) is a vector of constants that factors in previous error residual and also avoids high SNR stalling by accounting for minimum distance between QAM symbols, Q_d.

After operation 710A, the flowchart 701 transitions to operation 720, where two Gaussian random vectors (Nt dimensional) with mean=0, variance=1 are drawn, denoted as φ and ψ. That is, unlike in the channel estimation method, operation 715 is omitted.

After operation 720, the flowchart 701 transitions to operation 725, where the drawn samples are mapped to the desired Gaussian PDF with mean μ and variance $\sigma^2$. In an exemplary aspect, the mapping is based on the following equation:

$$\tilde{X}_{cand} = \{\Re(\mu) + \sigma \cdot \varphi\} + i\{\Im(\mu) + \sigma \cdot \psi\}$$

$\Re(\mu)$, $\Im(\mu)$ refer to real and imaginary parts of mean $\mu = X_{i-1} + (H'H + \sigma^2 I)^{-1} H'(Y - HX)$ respectively, φ and ψ are zero-mean unit-variance Gaussian random vectors (denoted as R in Equation (14)) and i denotes the complex imaginary number.

In an exemplary aspect, for symbol demodulation, samples drawn from the conditionals are then mapped onto the closest QAM constellation point according to Equation below. This advantageously is a simple slicing operation in hardware.

$$X_{cand} = \operatorname{argmin}(\tilde{X}_{cand}, Q) \quad (13)$$

Where Q refers to the set of possible discrete QAM modulated symbols.

After operation 725, the flowchart 701 transitions to operation 730, where the acceptance probability is calculated using the ratio of likelihoods of proposal and the previous sample.

In an exemplary aspect, the acceptance probability is calculated according to the following equation:

$$\alpha = \min\left(\frac{|Y - HX_{cand}|^2}{|Y - HX_{i-1}|^2}\right)$$

X$_{cand}$ denotes the candidate transmitted symbol calculated in operation 725 and X$_{i-1}$ denotes the transmitted symbol estimated in previous sample draw/iteration for same variable index. Y refers to the received signal and H denotes the estimate of channel coefficients.

After operation 730, the flowchart 701 transitions to operation 735, where the sample is drawn from Uniform PDF. For example, the operation includes drawing a uniform random variable u. In an exemplary aspect, the sample draw corresponds to the equation below:

$$u \in U(0, 1)$$

After operation 735, the flowchart 701 transitions to operation 740, where it is determined if α>u. This determination can include a comparison of α with u.

If u is less than α, the flowchart 701 transitions to operation 745, where the proposal is accepted (X$_i$=X$_{cand}$).

If u is greater than or equal to α, the flowchart 701 transitions to operation 750, where the proposal is rejected (X$_i$=X$_{i-1}$).

After operations 745 and 750, the flowchart 701 returns to operation 710 to sample the next variable.

MH-GD Sampling for Joint Channel Estimation and Symbol Demodulation

In an exemplary aspect, the MCMC sampler 306 may be configured to perform joint sampling for Channel Estimation and Symbol demodulation, where both channel coefficients and symbols are drawn using the MH-GD method using respective proposal and acceptance distributions. As can be appreciated, the algorithm for such joint sampling would be formed from the merging of the MH-GD algorithm for channel estimation and the MH-GD algorithm for Symbol demodulation. As will be appreciated, the process flow for joint sampling for Channel Estimation and Symbol demodulation would include the combination of the process flows for MH-GD Sampling based Channel Estimation and MH-GD Sampling based Symbol demodulation. Further, obtaining channel estimate H entails performing operations 705-750 according to flowchart 700 as described above while symbol demodulation X entails performing operations 705-750 according to flowchart 701 as described above.

Demodulation and Decoding

In exemplary aspects, the receiver 120 is configured such that probability priors can be iteratively passed between the symbol demodulator 210 and the decoder 215. Advantageously, the receiver 120 according to exemplary aspects is configured such that the computing of LLRs by the receiver 120 (e.g. by the decoder 215) is not longer for the decoding operations by the decoder 215. This advantageously reduces the computation time by the receiver 120 as the calculation of LLRs generally require extension computation. In these examples, the MCMC-based structure according to exemplary aspects allows for a single, unified hardware.

In an exemplary aspect, the demodulator 210 is configured to perform a Gibbs-based Markov Chain Monte Carlo (MCMC) methods, which has near optimal performance at low signal-to-noise-ratio (SNR) and to have efficient hardware implementations. In exemplary aspect, the method includes a random walk through the permutations of the transmitted bit sequence to estimate the posterior probability distribution and accordingly generate soft-output information.

In an exemplary aspect, for a system with $N_R$ receive antennas, $N_T$ transmit antennas, a transmitted symbol vector $x \in \mathbb{C}^{N_T \times 1}$, a received symbol vector $y \in \mathbb{C}^{N_R \times 1}$, a channel response matrix $H \in \mathbb{C}^{N_R \times N_T}$, with additive gaussian noise power $\sigma_{NOISE}^2=1/\text{SNR}$, the Gibbs-MCMC MIMO demodulation algorithm satisfies the following pseudo-code:

Algorithm for MCMC-Based MIMO Demodulation

Listing 1:
Pseudo-code to generate a Gibbs-MCMC MIMO demodulation sample.

```
1    fork = 1: n_samples
2      for j = 1: N_T
3        Compute: μ_j = (h_j*/|h_j|²₂)[y − (Hs^(k−1) − h_j s_j^(k−1))]
4        Compute: σ_j² = σ²_NOISE / |h_j|²₂
5        Pull random sample s_j^(k) = 𝒩(μ_j, σ_j²) + 𝒩(μ_j, σ_j²)i
6        Map sample s_j^(k) to the closest constellation point
7        Save sample s^(k)
8      Compute and return LLR
```

MCMC detectors may experience a performance degradation at higher SNR values. This issue is caused by stalling at high SNR. In an exemplary aspect, to reduce or avoid degrading performance, receiver 120 can include a sampler 306 that is configured to determine the variance based on the quantization noise power $\sigma_{QAM}^2$ to reduce or eliminate stalling at high SNR. In an exemplary aspect, to determine the variance based on the quantization noise power, the sampler 906 can replace the Gaussian noise power $\sigma_{NOISE}^2$ in the calculation of the variance $$\sigma_j^2 = \frac{\sigma_{NOISE}^2}{|h_j|_2^2}$$

with $\sigma_{MIMO}^2$, where:

$$\sigma_{MIMO}^2 = \left( \frac{1}{\frac{1}{\sigma_{NOISE}^2} + \frac{1}{\sigma_{QAM}^2}} \right)$$

This substitution results in the variance $\sigma_j^2$ being calculated based on the following Equation (15):

$$\sigma_j^2 = \frac{\sigma_{MIMO}^2}{|h_j|_2^2} = \frac{\left(1 / \left[\frac{1}{\sigma_{NOISE}^2} + \frac{1}{\sigma_{QAM}^2}\right]\right)}{|h_j|_2^2}$$

With the modified variance calculation, the Gibbs-MCMC MIMO demodulation algorithm is updated as shown below in pseudo-code Listing 2:

Listing 2:
Updated pseudo-code to consider the quantization noise introduced by constellation mapping.

```
1    for k = 1: n_samples
2      for j = 1: N_T
3        Compute: μ_j = (h_j*/|h_j|²₂)[y − (Hs^(k−1) − h_j s_j^(k−1))]
4        Compute: σ_j² (σ²_MIMO/|h_j|²₂) = (1/[1/σ²_NOISE + 1/σ²_QAM]) / |h_j|²₂
5        Pull random sample s_j^(k) = 𝒩(μ_j, σ_j²) + 𝒩(μ_j, σ_j²)i
6        Map sample s_j^(k) to the closest constellation point
7        Save sample s^(k)
8      Compute and return LLR
```

MCMC-Based Forward Error Correction (FEC)

In an exemplary aspect, the decoder 215 is configured as a Metropolis-Hastings MCMC (MH-MCMC) LDPC decoder. In this example, the decoder 215 is configured to receive, as inputs: a parity check matrix (H∈ $R^{K \times N}$), and 2) an Initial log-likelihood ratio (LLR∈ $R^{N \times 1}$) for each bit in the received code word.

In an exemplary aspect, the decoder 215 is configured to precompute, before iterating:
1. the initial code word $X_0$=LLR<0;
2. the initial syndrome $S^0$=H$X_0$∈ $R^{K \times 1}$; and
3. the bit-flipping probability of each bit in the code word PF=$P_0 \circ X_0 + (1-P_0) \circ (1-X_0)$, where $P_0 = e^{LLR}/(1+e^{LLR})$.

With the initial starting point, the decoder 215 can iterate through the MH-MCMC algorithm as shown below. In an exemplary aspect, it is assumed a maximum of 1-bit flip per iteration, which can be generalized to multiple bits as would be understood by one of ordinary skill in the art. In an exemplary aspect, the MH-MCMC algorithm includes the following operations:

1. Compute the weighted error probability for each bit: $W_{ERR}$=PF∘$H^T S_K$
2. Normalize $W_{ERR}$ to compute the probability that each bit is our target "bit to flip": $P_{BIT2FLIP}$
3. Select a uniform random number $U_1$ on [0,1) to select a bit B to flip
4. Flip bit B in $X_K$ to generate $X_{K+1}$
5. Compute $S_{K+1}$=$S_K$+H(:,B)
6. (MH STEP): Compute acceptance probability A=(SUM($S_K$)+1)/SUM($S_{K+1}$)
7. Select a uniform random number $U_2$ on [0,1). If $U_2$<A, update PF(B):
   IF SUM($S_{K+1}$)>SUM($S_K$): PF(B)=1−(PF(B)*(1−$P_{BIT2FLIP}$(B)))
   Otherwise: PF(B)=(1−PF(B))*(1−$P_{BIT2FLIP}$(B))
8. Repeat for N iterations.

In the above algorithm, Operation 1 uses the syndrome to compute the number of failing parity check equations each bit belongs to and weights them by a measure of confidence (the probability that the bit is in error; i.e. if the bit is currently assumed to be a "1", what is the probability it is actually a "0", and vice versa).

Operations 2 and 3 normalize these probabilities and uses a uniform random number to select a candidate bit B to flip.

Operations 4 and 5 compute the updated codeword and syndrome.

Operations 6 and 7 perform the Metropolis-Hastings step by computing an acceptance ratio based upon the number of failing parity check equations in the syndrome. If accepted, operation 7 also updates our confidence measure of the flipped bit.

Operation 8: at the end of N iterations, the sampled code words are averaged to derive the posterior bit distributions.

Advantageously, the result is several orders of magnitude reduction in the number of iterations compared to Gibbs-MCMC algorithm, while matching or exceeding the performance of a general belief propagation (BP) decoder.

Information Sharing for Joint MIMO Demodulation and Forward Error Correction

In an exemplary aspect, the decoder 215 is a MH-MCMC FEC decoder (e.g. LDPC decoder), and is configured to decode the bits based on the raw probability that the bit is "1", which is calculated by averaging the demodulated symbols samples (e.g. see operation 7 in Listing 2). In this aspect, the raw probability is used instead of a calculated bit log-likelihood ratios (LLRs) (see operation 8 of Listing 2 where LLR are calculated). In an exemplary aspect, after a round of iterations from the MH-MCMC FEC decoder 215, information is passed back information to the MCMC MIMO demodulator 210. In an exemplary aspect, to pass back information, $\sigma_{MIMO}^2$ is updated as $\sigma_{JOINT}^2$ (Equation 16) and $\mu_j$ is updated as $\mu_{JOINT}$ (Equation 17), as follows:

$$\sigma_{MIMO}^2 \rightarrow \sigma_{JOINT}^2 = \left(\frac{1}{\frac{1}{\sigma_{MIMO}^2} + \frac{1}{\sigma_{FEC}^2}}\right) \quad (16)$$

$$\mu_j \rightarrow \mu_{JOINT} = \left(\frac{\mu_j}{\sigma_{MIMO}^2} + \frac{\mu_{FEC}}{\sigma_{FEC}^2}\right)\sigma_{JOINT}^2 \quad (17)$$

where $\mu_{FEC}$ and $\sigma_{FEC}^2$ are the straightforward calculation of the mean and variance of the transmitted symbols based upon the bit-probabilities derived at the end of the MH-MCMC FEC decoder 215.

Listing 3 shows the updated pseudo-code for the MCMC MIMO demodulator 215 according to an exemplary aspect. It should be noted that $\mu_{FEC}$ and $\sigma_{FEC}^2$ are initialized to 0 and ∞ at the start of the first iteration before feedback information from the MH-MCMC LDPC decoder 215 is available. Under those conditions, the calculations in Listing 3 simplify to Listing 2.

Listing 3:
Updated pseudo-code to incorporate information passed back from the MH-MCMC FEC decoder.

```
1    for k = 1: n_samples
2       for j = 0 1: N_T
3          Compute: σ²_MIMO = (1 / (1/σ²_NOISE + 1/σ²_QAM))
4          Compute: σ²_JOINT = (1 / (1/σ²_MINO + 1/σ²_FEC))
5          Compute: μ_iter = h*_j/|h_j|²² [y - (Hs^(k-1) - h_j s_j^(k-1))]
6          Compute: μ_j = (μ_iter/σ²_MIMO + μ_FEC/σ²_FEC) σ²_JOINT
7          Compute: σ²_j = σ²_JOINT / |h_j|²²
8          Pull random sample s_j^(k) = 𝒩(μ_j, σ_j²) + 𝒩(μ_j, σ_j²)i
9          Map sample s_j^(k) to the closest constellation point
10         Save sample s^(k)
11         Compute and return LLR
```

EXAMPLES

Example 1 is a receiver of a communication device, comprising: a channel estimator configured to receive a signal and estimate channel coefficients; a symbol demodulator configured to demodulate the received signal and estimate transmitted symbols based on the channel coefficients; a decoder configured to decode the estimated transmitted symbols to generate an output bit sequence; and a sampler configured to generate samples based on the channel coefficients, the transmitted symbols, or the output bit sequence, using Markov-Chain Monte-Carlo (MCMC) sampling, the generated samples being used in one or more of: the channel estimation, the demodulation, and the decoding.

Example 2 is the subject matter of Example 1, wherein the sampler comprises an a priori calculator configured to determine a priori information of the channel coefficients.

Example 3 is the subject matter of Example 2, wherein the sampler is further configured to: determine likelihood information; and determine a posteriori PDF based on the a priori information and the likelihood information to estimate the channel coefficients.

Example 4 is the subject matter of Example 1, wherein the sampler is configured to determine likelihood information, the demodulation being based on the likelihood information.

Example 5 is the subject matter of Example 1, wherein the sampler is reconfigurable for determining likelihood information and a priori information, in order to perform the channel estimation, the demodulation, and the decoding.

Example 6 is the subject matter of Example 5, wherein the samples are generated based on: for the channel estimation: the likelihood information and the a priori information; and for the demodulation: the likelihood information and, if the symbols are unequally likely, the a priori information.

Example 7 is the subject matter of any of Examples 2-6, wherein the a priori information is determined based on known or estimated signal or channel characteristics.

Example 8 is the subject matter of any of Examples 2-6, wherein the a priori information is determined based on known or estimated a channel covariance matrix.

Example 9 is the subject matter of any of Examples 1-8, wherein the generated samples comprise samples of channel coefficients, transmitted symbols, or the output bit sequence.

Example 10 is the subject matter of any of Examples 1-9, wherein the MCMC sampling comprises Gibbs sampling.

Example 11 is the subject matter of any of Examples 1-9, wherein the MCMC sampling comprises Metropolis Hastings (MH) sampling.

Example 12 is the subject matter of any of Examples 1-9, wherein the MCMC sampling comprises Metropolis Hastings (MH) sampling based on Gradient descent (GD).

Example 13 is the subject matter of Example 12, wherein the GD comprises using a first derivative of an error function (e.g. Negative of Log Posterior (NLP) function) or a loss function as a mean of a proposal move, and using a second derivative of the error or loss function as a variance of the proposal move.

Example 14 is the subject matter of any of Examples 1-13, wherein the MCMC sampling comprises sequential sampling for the channel estimation, the demodulation, and the decoding.

Example 15 is the subject matter of any of Examples 1-13, wherein the MCMC sampling comprises joint sampling for the channel estimation and the demodulation.

Example 16 is the subject matter of Example 15, wherein the joint sampling comprises feeding back demodulation information from the demodulator to the channel estimator, the sampler being configured to evaluate a search space based on the demodulation information.

Example 17 is the subject matter of any of Examples 1-16, wherein the sampler is configured to determine variance likelihood information based on a quantization noise power.

Example 18 is the subject matter of any of Examples 1-17, wherein the decoder is configured to determine: an initial code word based on the demodulated signal; and a bit-flipping probability of each bit in the code word to generate the output bit sequence.

Example 19 is the subject matter of any of Examples 1-18, wherein the decoder is configured to: determine a bit-value probability; and feed the bit-value probability back to the demodulator to demodulate the received signal based on the bit-value probability.

Example 20 is the subject matter of Example 19, wherein the decoder omits a calculation of bit log-likelihood ratios in determining the bit-value probability.

Example 21 is the subject matter of any of Examples 1-20, wherein the MCMC sampling comprises joint sampling for the demodulation and the decoding.

Example 22 is the subject matter of Example 21, wherein the joint sampling comprises feeding back decoding information from the decoder to the symbol demodulator, the sampler being configured to evaluate a search space based on the decoding information.

Example 23 is a communication device comprising the receiver of any of Examples 1-22.

Example 24 is a receiver of a communication device, comprising: channel estimating means for receiving a signal and estimating channel coefficients; symbol demodulating means for demodulating the received signal and estimate transmitted symbols based on the channel coefficients; decoding means for decoding the estimated transmitted symbols to generate an output bit sequence; and sampling means for generating samples based on the channel coefficients, the transmitted symbols, or the output bit sequence, using Markov-Chain Monte-Carlo (MCMC) sampling, the generated samples being used in one or more of: the channel estimation, the demodulation, and the decoding.

Example 25 is the subject matter of Example 24, wherein the sampling means comprises a priori calculating means for determining a priori information of the channel coefficients.

Example 26 is the subject matter of Example 25, wherein the sampling means is further configured to: determine likelihood information; and determine a posteriori PDF based on the a priori information and the likelihood information to estimate the channel coefficients.

Example 27 is the subject matter of Example 24, wherein the sampling means is configured to determine likelihood information, the demodulation being based on the likelihood information.

Example 28 is the subject matter of Example 24, wherein the sampling means is reconfigurable for determining likelihood information and a priori information, in order to perform the channel estimation, the demodulation, and the decoding.

Example 29 is the subject matter of Example 28, wherein the samples are generated based on: for the channel estimation: the likelihood information and the a priori information; and for the demodulation: the likelihood information and, if the symbols are unequally likely, the a priori information.

Example 30 is the subject matter of any of Examples 25-29, wherein the a priori information is determined based on known or estimated signal or channel characteristics.

Example 31 is the subject matter of any of Examples 25-29, wherein the a priori information is determined based on known or estimated a channel covariance matrix.

Example 32 is the subject matter of any of Examples 24-31, wherein the generated samples comprise samples of channel coefficients, transmitted symbols, or the output bit sequence.

Example 33 is the subject matter of any of Examples 24-32, wherein the MCMC sampling comprises Gibbs sampling.

Example 34 is the subject matter of any of Examples 24-32, wherein the MCMC sampling comprises Metropolis Hastings (MH) sampling.

Example 35 is the subject matter of any of Examples 24-32, wherein the MCMC sampling comprises Metropolis Hastings (MH) sampling based on Gradient descent (GD).

Example 36 is the subject matter of Example 35, wherein the GD comprises using a first derivative of an error function (e.g. Negative of Log Posterior (NLP) function) or a loss function as a mean of a proposal move, and using a second derivative of the error or loss function as a variance of the proposal move.

Example 37 is the subject matter of any of Examples 24-36, wherein the MCMC sampling comprises sequential sampling for the channel estimation, the demodulation, and the decoding.

Example 38 is the subject matter of any of Examples 24-36, wherein the MCMC sampling comprises joint sampling for the channel estimation and the demodulation.

Example 39 is the subject matter of Example 38, wherein the joint sampling comprises feeding back demodulation information from the demodulating means to the channel estimating means, the sampling means being configured to evaluate a search space based on the demodulation information.

Example 40 is the subject matter of any of Examples 24-39, wherein the sampling means is configured to determine variance likelihood information based on a quantization noise power.

Example 41 is the subject matter of any of Examples 24-40, wherein the decoding means is configured to determine: an initial code word based on the demodulated signal; and a bit-flipping probability of each bit in the code word to generate the output bit sequence.

Example 42 is the subject matter of any of Examples 24-41, wherein the decoding means is configured to: determine a bit-value probability; and feed the bit-value probability back to the demodulating means to demodulate the received signal based on the bit-value probability.

Example 43 is the subject matter of Example 42, wherein the decoding means omits a calculation of bit log-likelihood ratios in determining the bit-value probability.

Example 44 is the subject matter of any of Examples 24-43, wherein the MCMC sampling comprises joint sampling for the demodulation and the decoding.

Example 45 is the subject matter of Example 44, wherein the joint sampling comprises feeding back decoding information from the decoding means to the symbol demodulating means, the sampling means being configured to evaluate a search space based on the decoding information.

Example 46 is a communication device comprising the receiver of any of Examples 24-45.

Example 47 is a Markov-Chain Monte-Carlo (MCMC) sampler for generating samples, comprising: an a priori calculator configured to determine a priori information based on a received signal; and a likelihood calculator configured to generate likelihood information based on the received signal, wherein the MCMC sampler is configured to generate the samples selectively based on the likelihood information and the a priori information.

Example 48 is the subject matter of Example 47, further comprising an a posteriori calculator configured to calculate a posteriori information based on the likelihood information and the a priori information, wherein the MCMC sampler is configured to generate the samples based on the a posteriori information.

Example 49 is a Markov-Chain Monte-Carlo (MCMC) sampler for generating samples, comprising: a priori calculating means for determining a priori information based on a received signal; and likelihood calculating means for generating likelihood information based on the received signal, wherein the MCMC sampler is configured to generate the samples selectively based on the likelihood information and the a priori information.

Example 50 is the subject matter of Example 49, further comprising an a posteriori calculating means for calculating a posteriori information based on the likelihood information and the a priori information, wherein the MCMC sampler is configured to generate the samples based on the a posteriori information.

Example 51 is a wireless receiver comprising the MCMC sampler of any of Examples 47-50.

Example 52 is an apparatus as shown and described.

Example 53 is a method as shown and described.

Example 54 is a non-transitory computer-readable storage medium with an executable computer program stored thereon, the program instructing a processor to perform the method as shown and described.

Example 55 is a computer program product having a computer program which is directly loadable into a memory of a controller, when executed by the controller, causes the controller to perform the method as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), register, and programmable read only memory (PROM). The memory can be non-removable, removable, or a combination of both.

Various aspects herein may utilize one or more machine learning models to perform corresponding functions of the communication device, such as the receiver (or other functions described herein). The term "model" as, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may then be used during an inference phase to make predictions or decisions based on input data.

The machine learning models described herein may take any suitable form or utilize any suitable techniques. For example, any of the machine learning models may utilize supervised learning, semi-supervised learning, unsupervised learning, or reinforcement learning techniques.

In supervised learning, the model may be built using a training set of data that contains both the inputs and corresponding desired outputs. Each training instance may include one or more inputs and a desired output. Training may include iterating through training instances and using an objective function to teach the model to predict the output for new inputs. In semi-supervised learning, a portion of the inputs in the training set may be missing the desired outputs.

In unsupervised learning, the model may be built from a set of data which contains only inputs and no desired outputs. The unsupervised model may be used to find structure in the data (e.g., grouping or clustering of data points) by discovering patterns in the data. Techniques that may be implemented in an unsupervised learning model include, e.g., self-organizing maps, nearest-neighbor mapping, k-means clustering, and singular value decomposition.

A machine learning model described herein may be or may include a neural network. The neural network may be any kind of neural network, such as a Bayesian neural network. Such a neural network may include any number of layers. The training of the neural network (e.g., adapting the layers of the neural network) may use or may be based on any kind of training principle, such as backpropagation (e.g., using the backpropagation algorithm).

Aspects of the present disclosure and any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Aspects of the disclosure may be applied to both the network and UE sides of the communication system.

The invention claimed is:

1. A receiver, comprising:
a channel estimator configured to receive a signal and estimate channel coefficients;
a symbol demodulator configured to demodulate the received signal and estimate transmitted symbols based on the estimated channel coefficients;
a decoder configured to decode the estimated transmitted symbols to generate an output bit sequence; and
a sampler configured to generate samples based on the estimated channel coefficients, the estimated transmitted symbols, or the output bit sequence, using Markov-Chain Monte-Carlo (MCMC) sampling, the generated samples being used in one or more of: the channel estimation, the demodulation, and the decoding.

2. The receiver of claim 1, wherein the sampler comprises an a priori calculator configured to determine a priori information of the estimated channel coefficients.

3. The receiver of claim 2, wherein the sampler is further configured to:
determine likelihood information; and
determine a posteriori probability density function (PDF) based on the a priori information and the likelihood information to estimate the channel coefficients.

4. The receiver of claim 1, wherein the sampler is configured to determine likelihood information, the demodulation being based on the likelihood information.

5. The receiver of claim 1, wherein the sampler is reconfigurable for determining likelihood information and a priori information to perform the channel estimation, the demodulation, and the decoding.

6. The receiver of claim 5, wherein the samples are generated based on:
for the channel estimation: the likelihood information and the a priori information; and
for the demodulation: the likelihood information and, if the symbols are unequally likely, the a priori information.

7. The receiver of claim 2, wherein the a priori information is determined based on known or estimated signal or channel characteristics.

8. The receiver of claim 2, wherein the a priori information is determined based on a known or an estimated channel covariance matrix.

9. The receiver of claim 1, wherein the generated samples comprise samples of channel coefficients, transmitted symbols, or the output bit sequence.

10. The receiver of claim 1, wherein the MCMC sampling comprises Gibbs sampling.

11. The receiver of claim 1, wherein the MCMC sampling comprises Metropolis Hastings (MH) sampling.

12. The receiver of claim 1, wherein the MCMC sampling comprises Metropolis Hastings (MH) sampling based on Gradient descent (GD).

13. The receiver of claim 12, wherein the GD comprises using a first derivative of an error or loss function as a mean of a proposal move, and using a second derivative of the error or loss function as a variance of the proposal move.

14. The receiver of claim 1, wherein the MCMC sampling comprises sequential sampling for the channel estimation, the demodulation, and the decoding.

15. The receiver of claim 1, wherein the MCMC sampling comprises joint sampling for the channel estimation and the demodulation.

16. The receiver of claim 15, wherein the joint sampling comprises feeding back demodulation information from the demodulator to the channel estimator, the sampler being configured to evaluate a search space based on the demodulation information.

17. The receiver of claim 1, wherein the sampler is configured to determine variance likelihood information based on a quantization noise power.

18. The receiver of claim 1, wherein the decoder is configured to determine:
an initial code word based on the demodulated signal; and
a bit-flipping probability of each bit in the code word to generate the output bit sequence.

19. The receiver of claim 1, wherein the decoder is configured to:
determine a bit-value probability; and
feed the bit-value probability back to the demodulator to demodulate the received signal based on the bit-value probability.

20. The receiver of claim 19, wherein the decoder omits a calculation of bit log-likelihood ratios in determining the bit-value probability.

21. The receiver of claim 1, wherein the MCMC sampling comprises joint sampling for the demodulation and the decoding.

22. The receiver of claim 21, wherein the joint sampling comprises feeding back decoding information from the decoder to the symbol demodulator, the sampler being configured to evaluate a search space based on the decoding information.

23. A communication device comprising the receiver of claim 1.

24. A Markov-Chain Monte-Carlo (MCMC) sampler for generating samples, comprising:
an a priori calculator configured to determine a priori information of estimated channel coefficients of a channel of a received signal; and
a likelihood calculator configured to generate likelihood information based on the received signal, the likelihood information being used to demodulate the received signal and estimate transmitted symbols based on the estimated channel coefficients,
wherein the MCMC sampler is configured to generate the samples selectively based on the likelihood information and the a priori information.

25. The MCMC sampler of claim 24, further comprising:
an a posteriori calculator configured to calculate a posteriori information based on the likelihood information and the a priori information,
wherein the MCMC sampler is configured to generate the samples based on the a posteriori information.

26. The MCMC sampler of claim 24, wherein:
the estimated transmitted symbols are decoded to generate an output bit sequence,
the MCMC sampler is configured to generate the samples selectively based on the estimated channel coefficients, the estimated transmitted symbols, or the output bit sequence, and
the generated samples are used in one or more of: channel estimation, demodulation, and decoding.

* * * * *